(12) United States Patent
Yoshida et al.

(10) Patent No.: US 12,265,290 B2
(45) Date of Patent: Apr. 1, 2025

(54) LIQUID CRYSTAL PANEL AND LIQUID CRYSTAL DISPLAY DEVICE

(71) Applicant: Sharp Display Technology Corporation, Kameyama (JP)

(72) Inventors: Takehisa Yoshida, Kameyama (JP); Fumikazu Shimoshikiryoh, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/379,437

(22) Filed: Oct. 12, 2023

(65) Prior Publication Data

US 2024/0176173 A1    May 30, 2024

(30) Foreign Application Priority Data

Nov. 11, 2022   (JP) ................................. 2022-181134

(51) Int. Cl.
| | | |
|---|---|---|
| *G02F 1/13* | (2006.01) | |
| *G02F 1/1334* | (2006.01) | |
| *G02F 1/1335* | (2006.01) | |
| *G02F 1/13357* | (2006.01) | |

(52) U.S. Cl.
CPC .......... *G02F 1/1323* (2013.01); *G02F 1/1334* (2013.01); *G02F 1/133512* (2013.01); *G02F 1/133553* (2013.01); *G02F 1/133615* (2013.01)

(58) Field of Classification Search
None
See application file for complete search history.

(56) References Cited

U.S. PATENT DOCUMENTS

| | | | |
|---|---|---|---|
| 5,877,829 A | | 3/1999 | Okamoto et al. |
| 2017/0285396 A1* | | 10/2017 | Nimura ............. G02F 1/136209 |
| 2018/0059450 A1* | | 3/2018 | Li ...................... G02F 1/133512 |
| 2018/0144671 A1* | | 5/2018 | Li ............................. G09G 3/36 |
| 2022/0155631 A1* | | 5/2022 | Xin ......................... B60K 35/22 |
| 2022/0163857 A1* | | 5/2022 | Watanabe ......... G02F 1/136227 |
| 2023/0017110 A1* | | 1/2023 | Adachi ............. G02F 1/133502 |
| 2024/0069370 A1* | | 2/2024 | Zhou .................... G02F 1/1323 |

FOREIGN PATENT DOCUMENTS

| | | | | |
|---|---|---|---|---|
| CN | 104570467 A | * | 4/2015 | ....... G02F 1/133512 |
| JP | H9-197405 A | | 7/1997 | |

* cited by examiner

*Primary Examiner* — Shan Liu
(74) *Attorney, Agent, or Firm* — ScienBiziP, P.C.

(57) ABSTRACT

Provided are a liquid crystal panel capable of controlling a viewing angle with a reduced thickness and a liquid crystal display device including the liquid crystal panel. A liquid crystal panel including: a polymer dispersed liquid crystal layer; first light-shielding portions extending parallel to one another; second light-shielding portions extending parallel to one another in the same direction as the first light-shielding portions and located closer to a viewing surface side than the first light-shielding portions are.

15 Claims, 21 Drawing Sheets

1

LIQUID CRYSTAL PANEL AND LIQUID CRYSTAL DISPLAY DEVICE

CROSS-REFERENCE TO RELATED APPLICATIONS

The present application claims priority under 35 U.S.C. § 119 to Japanese Patent Application No. 2022-181134 filed on Nov. 11, 2022, the contents of which are incorporated herein by reference in their entirety.

BACKGROUND OF THE INVENTION

Field of the Invention

The present disclosure relates to a liquid crystal panel and a liquid crystal display device.

Description of Related Art

Liquid crystal panels are optical elements in each of which voltage is applied to a liquid crystal composition sealed between paired substrates such that the alignment of liquid crystal molecules in the liquid crystal composition is changed according to the applied voltage so that the amount of light passing through the panel is thereby controlled. Such liquid crystal panels have advantageous features such as thin profile, light weight, and low power consumption, and are, therefore, used in a variety of fields.

Studies to enhance viewing angle characteristics of display devices have been made such that the same image can be observed regardless of whether the angle of observation is in a narrow viewing angle range or a wide viewing angle range. Meanwhile, a display method considered in terms of privacy protection is one that allows observation of an image in a narrow viewing angle range but makes the image difficult to observe in a wide viewing angle range. Such studies and consideration suggest a desire for display devices capable of switching between these modes, namely a public mode (wide viewing angle mode) that allows observation of the same image both in a narrow viewing angle range and in a wide viewing angle range and a privacy mode (narrow viewing angle mode) that allows observation of an image in a narrow viewing angle range but makes the image difficult to observe in a wide viewing angle range.

As a technique regarding an optical element such as a liquid crystal panel for use in a display device capable of switching between a public mode and a privacy mode, JP H09-197405 A, for example, discloses a liquid crystal display device including a liquid crystal display element, an illumination means that applies collimated light to the liquid crystal display element, and a means for electrically controlling the traveling direction of a light beam from the liquid crystal display element or a light beam incident on the liquid crystal display element so that the liquid crystal display device can thereby change viewing angle characteristics.

BRIEF SUMMARY OF THE INVENTION

FIG. 35 is a schematic cross-sectional view showing a wide viewing angle mode of a liquid crystal display device of a comparative example. FIG. 36 is a schematic cross-sectional view showing a narrow viewing angle mode of the liquid crystal display device of the comparative example. A liquid crystal display device 1R of the comparative example illustrated in FIGS. 35 and 36 has a structure corresponding to the liquid crystal display device disclosed in JP H09-197405 A. Specifically, the liquid crystal display device 1R includes, sequentially from a viewing surface side toward a back surface side, a display panel 10, a liquid crystal panel 20R including polymer dispersed liquid crystal (PDLC), a louver layer 30R, and a backlight 40.

The display panel 10 includes, sequentially from the viewing surface side toward the back surface side, a color filter (CF) substrate 110 including a CF layer, and a thin-film transistor (TFT) substrate 120 including TFTs.

The liquid crystal panel 20R includes, sequentially from the viewing surface side toward the back surface side, a counter substrate as a first substrate 210, PDLC, and a TFT substrate as a second substrate 220. The PDLC has a structure in which a liquid crystal component is dispersed in a polymer network. As illustrated in FIGS. 35 and 36, the liquid crystal panel 20R including the PDLC changes the alignment of the liquid crystal component with application of voltage to thereby enable switching between a transmissive state and a scattering state by utilizing a difference in refractive index between the liquid crystal component and the polymer network. The liquid crystal panel 20R is in the scattering state during no voltage application, and is in the transmissive state during voltage application.

The louver layer 30R has a structure in which light-shielding layers 31 and transparent layers 32 are alternately arranged, and has the function of transmitting front light 1LA and blocking oblique light 1LB. That is, the louver layer 30R transmits light at a low polar angle and blocks light at a high polar angle. The polar angle herein means an angle formed by the direction in question (e.g., measurement direction) and the direction normal to the panel screen of the liquid crystal panel.

In the liquid crystal display device 1R of the comparative example, oblique light 1LB from the backlight 40 is blocked by the louver layer 30R, and only front light 1LA passes through the louver layer 30R. While the liquid crystal panel 20R is in the no-voltage application state, front light 1LA that has passed through the louver layer 30R is scattered by the liquid crystal panel 20R as illustrated in FIG. 35 and changes to front light 1LA and oblique light 1LB and enters the display panel 10. In this manner, in the no-voltage application state, backlight illumination is allowed to pass through a region ranging from the low polar angle side to the high polar angle side so that a wide viewing angle mode (public mode) can be thereby achieved.

While the liquid crystal panel 20R is in the voltage application state, front light 1LA that has passed through the louver layer 30R is not scattered as illustrated in FIG. 36, passes through the liquid crystal panel 20R, and enters the display panel 10. That is, only front light 1LA enters the display panel 10, and oblique light 1LB does not enter the display panel 10. In this manner, in the voltage application state, backlight illumination is not allowed to pass through the high polar angle side and is allows to pass only through the low polar angle side so that a narrow viewing angle mode (privacy mode) can be thereby achieved.

In the manner described above, in the liquid crystal display device 1R of the comparative example, to switch between the wide viewing angle mode and the narrow viewing angle mode, the liquid crystal panel 20R and the louver layer 30R are individually added to the display panel 10. This causes the problem of an increased thickness of the liquid crystal display device 1R of the comparative example.

In response to the above issues, an object of the present invention is to provide a liquid crystal panel capable of controlling a viewing angle with a reduced thickness, and a liquid crystal display device including the liquid crystal panel.

(1) In an embodiment of the present invention, a liquid crystal panel includes: a polymer dispersed liquid crystal layer; first light-shielding portions extending parallel to one another; and second light-shielding portions extending parallel to one another in the same direction as the first light-shielding portions and located closer to a viewing surface side than the first light-shielding portions are.

(2) In an embodiment of the present invention, the liquid crystal panel includes the structure (1), and each of the first light-shielding portions includes a reflective surface at a surface on a back surface side.

(3) In an embodiment of the present invention, the liquid crystal panel includes the structure (1) or (2), and in a plan view, the first light-shielding portions are located at the same positions as the second light-shielding portions in a panel center, and the first light-shielding portions are shifted from the second light-shielding portions in a panel end.

(4) In an embodiment of the present invention, the liquid crystal panel includes the structure (1), (2), or (3), and further includes third light-shielding portions extending parallel to one another in the same direction as the first light-shielding portions, located closer to the viewing surface side than the first light-shielding portions are, and located closer to a back surface side than the second light-shielding portions are.

(5) In an embodiment of the present invention, the liquid crystal panel includes the structure (4), and in a plan view, the first light-shielding portions and the third light-shielding portions are not disposed in first gaps, and the second light-shielding portions and the third light-shielding portions are not disposed in second gaps.

(6) In an embodiment of the present invention, the liquid crystal panel includes the structure (4) or (5), and further includes fourth light-shielding portions extending parallel to one another in the same direction as the first light-shielding portions, located closer to the viewing surface side than the first light-shielding portions are, and located closer to the back surface side than the third light-shielding portions are.

(7) In an embodiment of the present invention, the liquid crystal panel includes the structure (6), and in a plan view, the fourth light-shielding portions are located at the same positions as the first light-shielding portions.

(8) In an embodiment of the present invention, the liquid crystal panel includes the structure (4), (5), (6) or (7), the liquid crystal panel is an onboard liquid crystal panel disposed at a vehicle front side in front of a driver's seat and a passenger's seat, in a plan view, the first light-shielding portions and the second light-shielding portions are not disposed in third gaps and the third light-shielding portions and the second light-shielding portions are not disposed in fourth gaps, each of the third gaps is adjacent to a driver's seat side of one of the first light-shielding portions, and each of the fourth gaps is adjacent to a driver's seat side of one of the third light-shielding portions.

(9) In an embodiment of the present invention, the liquid crystal panel includes the structure (1), (2), (3), (4), (5), (6), (7), or (8), and the second light-shielding portions are disposed closer to the viewing surface side than the first light-shielding portions are, with the polymer dispersed liquid crystal layer interposed between the second light-shielding portions and the first light-shielding portions.

(10) In an embodiment of the present invention, the liquid crystal panel includes the structure (1), (2), (3), (4), (5), (6), (7), (8), or (9), and further includes an insulating layer located between the first light-shielding portions and the second light-shielding portions.

(11) In an embodiment of the present invention, the liquid crystal panel includes the structure (10), the insulating layer is provided with holes in a surface on the viewing surface side, and each of the second light-shielding portions covers a corresponding hole.

(12) In another embodiment of the present invention, a liquid crystal display device includes: the liquid crystal panel including the structure (1), (2), (3), (4), (5), (6), (7), (8), (9), (10), or (11); and a display panel that displays an image.

(13) In an embodiment of the present invention, the liquid crystal display device includes the structure (12), the display panel includes pixels arranged in a matrix pattern, and with a distance between adjacent first light-shielding portions being defined as a slit width of the first light-shielding portions, a width of each of the first light-shielding portions in a lateral direction being defined as a light-shielding width of the first light-shielding portions, and a sum of the slit width of the first light-shielding portions and the light-shielding width of the first light-shielding portions being defined as a slit pitch of the first light-shielding portions, a pixel pitch of the pixels is an integral multiple of the slit pitch of the first light-shielding portions.

(14) In an embodiment of the present invention, the liquid crystal display device includes the structure (12) or (13), and further includes a backlight, and the display panel is a liquid crystal display panel.

(15) In an embodiment of the present invention, the liquid crystal display device includes the structure (14), and includes, sequentially from the viewing surface side toward a back surface side, the liquid crystal display panel, the liquid crystal panel, and the backlight.

(16) In an embodiment of the present invention, the liquid crystal display device includes the structure (14), and includes, sequentially from the viewing surface side toward a back surface side, the liquid crystal panel, the liquid crystal display panel, and the backlight.

(17) In an embodiment of the present invention, the liquid crystal display device includes the structure (12) or (13), and the display panel is an organic electroluminescence display panel, and the liquid crystal display device includes, sequentially from the viewing surface side toward a back surface side, the liquid crystal panel and the organic electroluminescence display panel.

The present invention can provide a liquid crystal panel capable of controlling a viewing angle with a reduced thickness and a liquid crystal display device including the liquid crystal panel.

DETAILED DESCRIPTION OF THE INVENTION

Hereinafter, the present invention will be described in more detail by way of embodiments with reference to the drawings, but the present invention is not limited only to these embodiments.

Definition of Terms

The polar angle herein means an angle formed by the direction in question (e.g., measurement direction) and the direction normal to a panel screen of a liquid crystal panel. The azimuth herein means the direction in question in a view projected onto the panel screen of the liquid crystal panel and is expressed as an angle (azimuthal angle) formed with the reference azimuth. The reference azimuth (0°) is set to the horizontally right direction on the panel screen of the liquid crystal panel. The angle and azimuthal angle measure positive in the counterclockwise direction from the reference azimuth and measure negative in the clockwise direction from the reference azimuth. The counterclockwise direction and the clockwise direction are both the rotational directions when the panel screen of the liquid crystal panel is viewed from the viewing surface side (front). The angle represents a value measured in a plan view of the liquid crystal panel.

The expression that two axes are parallel herein means that they form an angle (absolute value) within the range of 0°±3°, preferably within the range of 0°±1°, more preferably within the range of 0°±0.5°, particularly preferably 0° (perfectly parallel).

Hereinafter, embodiments of the present invention will be described. The present invention is not limited to the following embodiments. The design may be modified as appropriate within the range satisfying the structure of the present invention.

Embodiment 1

Figure 1:
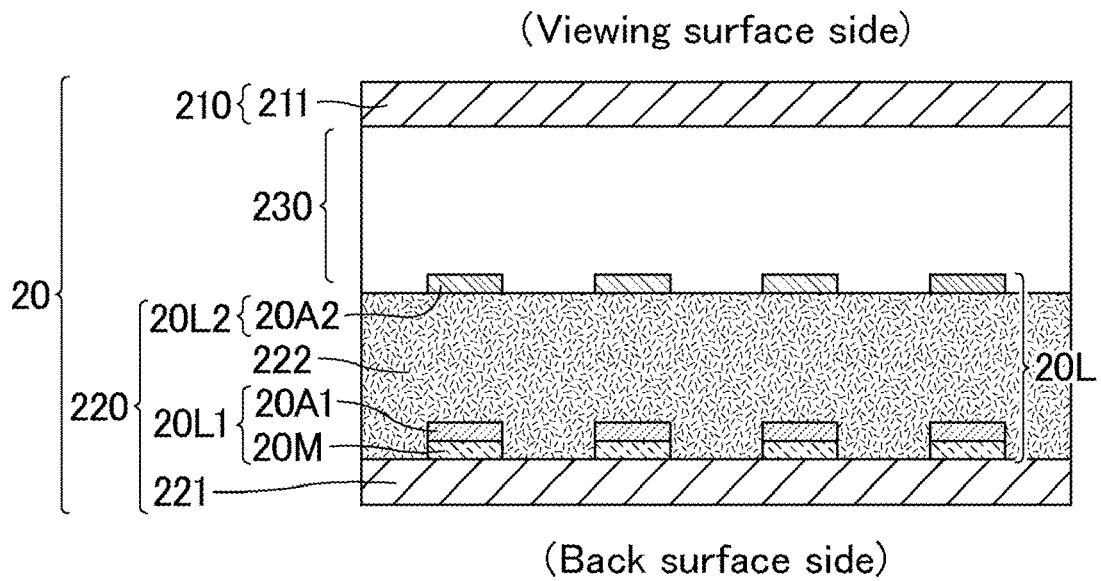
FIG. 1 is a schematic cross-sectional view of a liquid crystal panel of Embodiment 1.

FIG. 1 is a schematic cross-sectional view of a liquid crystal panel of Embodiment 1. As illustrated in FIG. 1, a liquid crystal panel 20 of the present embodiment includes first light-shielding portions 20L1 extending parallel to one another, and second light-shielding portions 20L2 extending parallel to one another in the same direction as the first light-shielding portions 20L1 and located closer to the viewing surface side than the first light-shielding portions 20L1 are. With this structure, the first light-shielding portions 20L1 and the second light-shielding portions 20L2 serve as a louver layer 20L that transmits front light and blocks oblique light.

The expression that light-shielding portions (e.g., the first light-shielding portions 20L1) extending parallel to one another means that an angle (absolute value) formed by two different light-shielding portions included in the light-shielding portions is within the range of 0°±3°, preferably within the range of 0°±1°, more preferably within the range of 0°±0.5°, particularly preferably 0° (perfectly parallel).

The expression that light-shielding portions (e.g., the second light-shielding portions 20L2) extend in the same direction as other light-shielding portions (e.g., the first light-shielding portions 20L1) means that an angle (absolute value) formed by one of the light-shielding portions and one of the other light-shielding portions is within the range of 0°±3°, preferably within the range of 0°±1°, more preferably within the range of 0°±0.5°, particularly preferably 0° (perfectly parallel).

The liquid crystal panel 20 includes polymer dispersed liquid crystal (PDLC) 230. With this structure, voltage applied to the PDLC 230 is adjusted to switch the mode between a scattering state in which light incident on the liquid crystal panel 20 is scattered and a transmissive state in which light incident on the liquid crystal panel 20 is transmitted.

In the comparative example, a liquid crystal panel 20R including PDLC and a louver layer 30R are individually disposed, and the viewing angle can be controlled by these two members. On the other hand, in the present embodiment, since the liquid crystal panel 20 includes the louver layer 20L in addition to the PDLC 230, the viewing angle can be controlled by the liquid crystal panel 20, that is, a single member. As a result, the liquid crystal panel 20 of the present embodiment can control the viewing angle with a reduced thickness, as compared to the comparative example. The liquid crystal panel 20 including the louver layer 20L and the PDLC 230 is also referred to as a viewing angle-controlling cell. A liquid crystal display device including the liquid crystal panel 20 of the present embodiment will now be described as an example.

Figure 2:
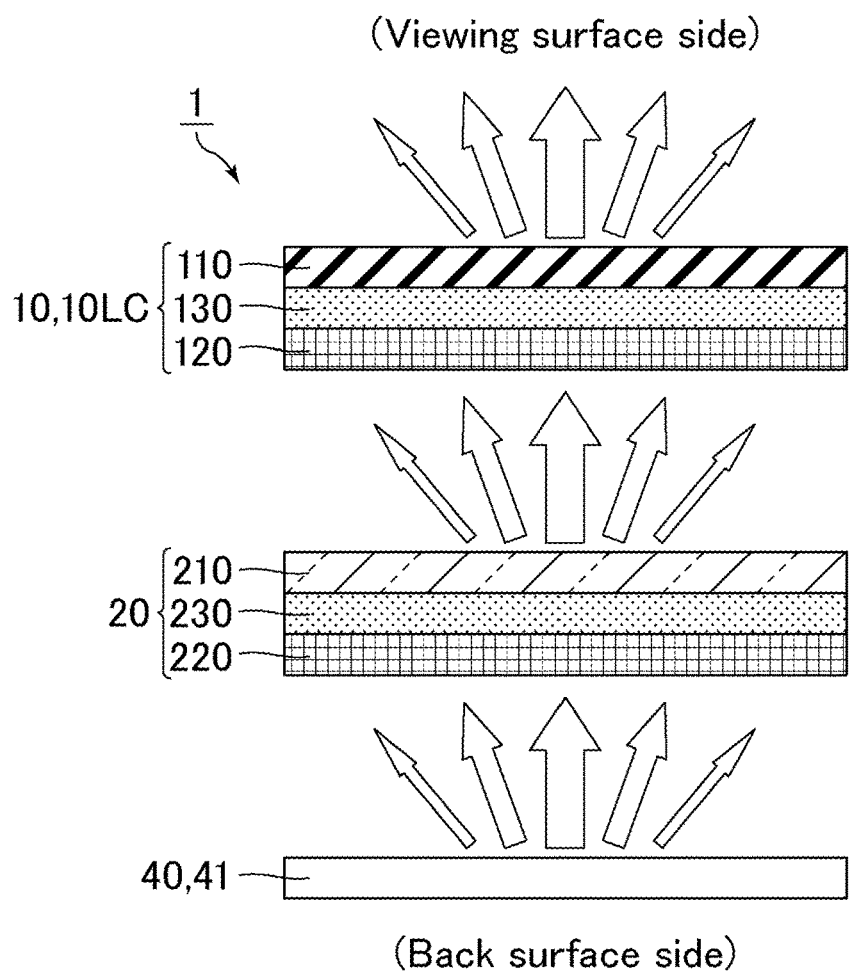
FIG. 2 is a schematic cross-sectional view showing a wide viewing angle mode of the liquid crystal display device of Embodiment 1.
Figure 3:
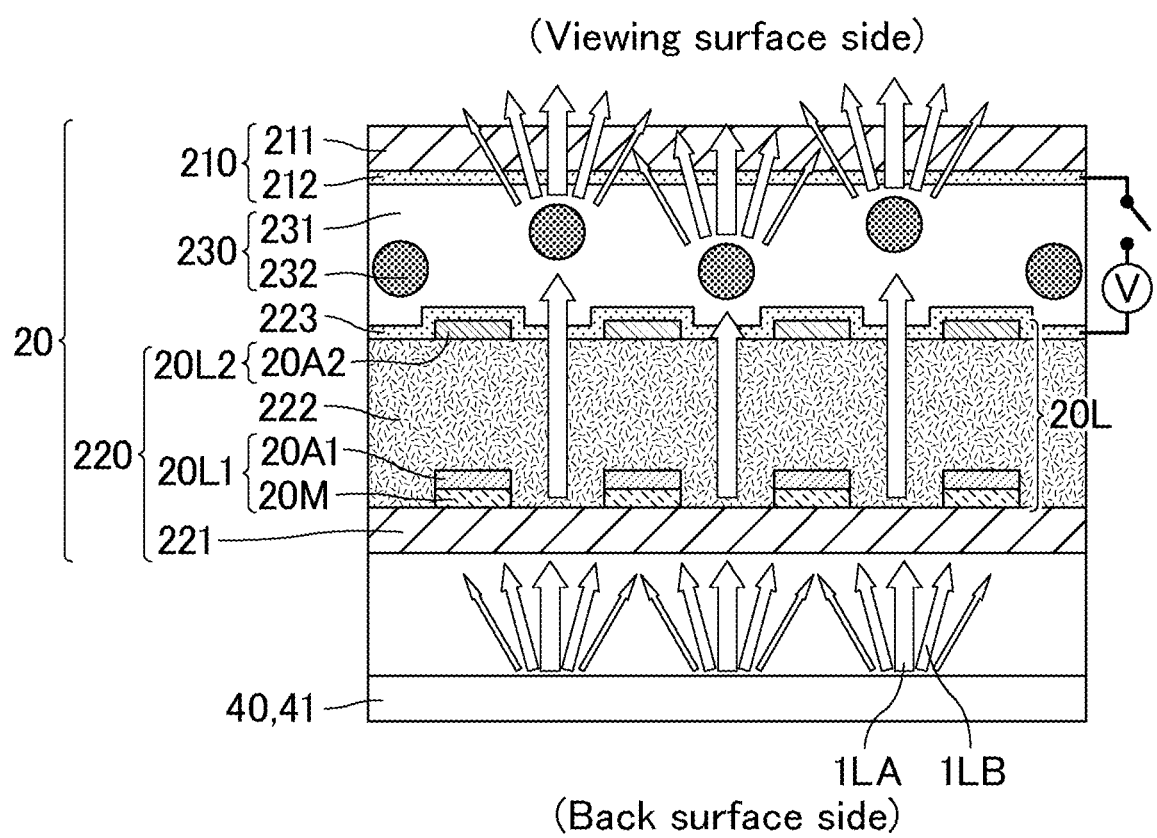
FIG. 3 is an enlarged schematic cross-sectional view showing the wide viewing angle mode of the liquid crystal display device of Embodiment 1.
Figure 4:
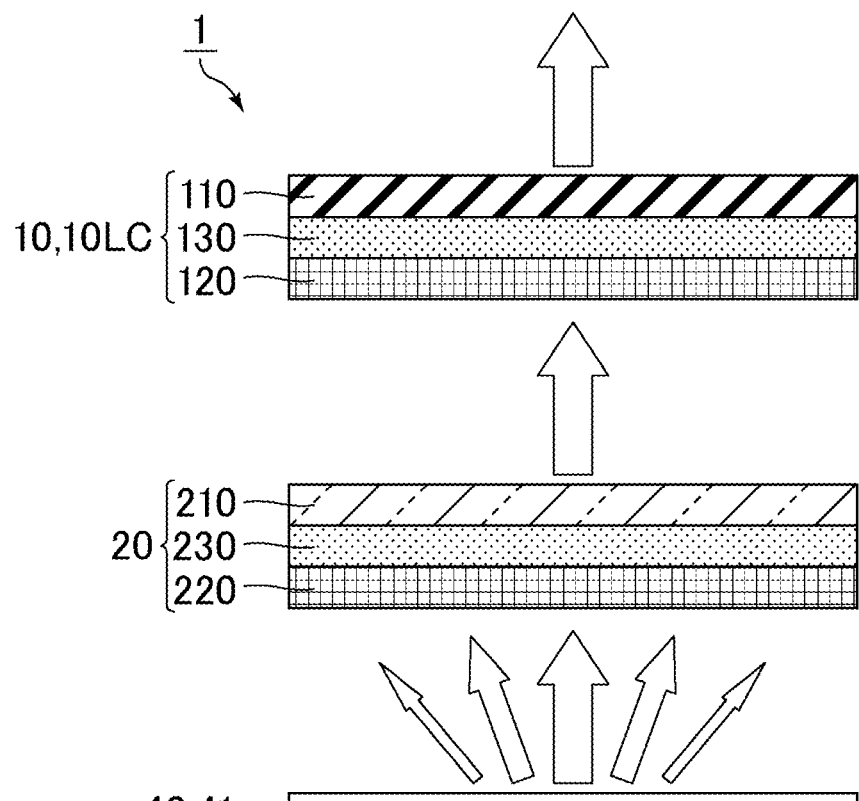
FIG. 4 is a schematic cross-sectional view showing a narrow viewing angle mode of the liquid crystal display device of Embodiment 1.
Figure 5:
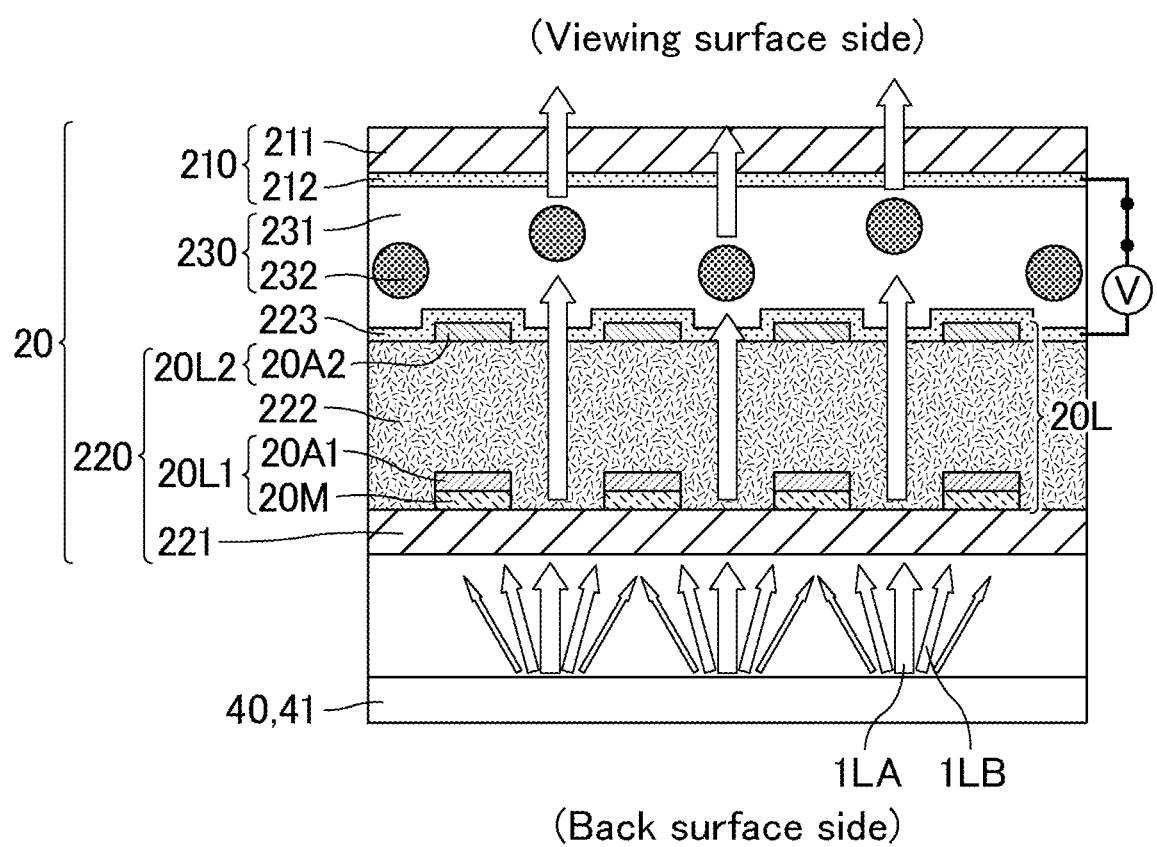
FIG. 5 is an enlarged schematic cross-sectional view showing the narrow viewing angle mode of the liquid crystal display device of Embodiment 1.
Figure 6:
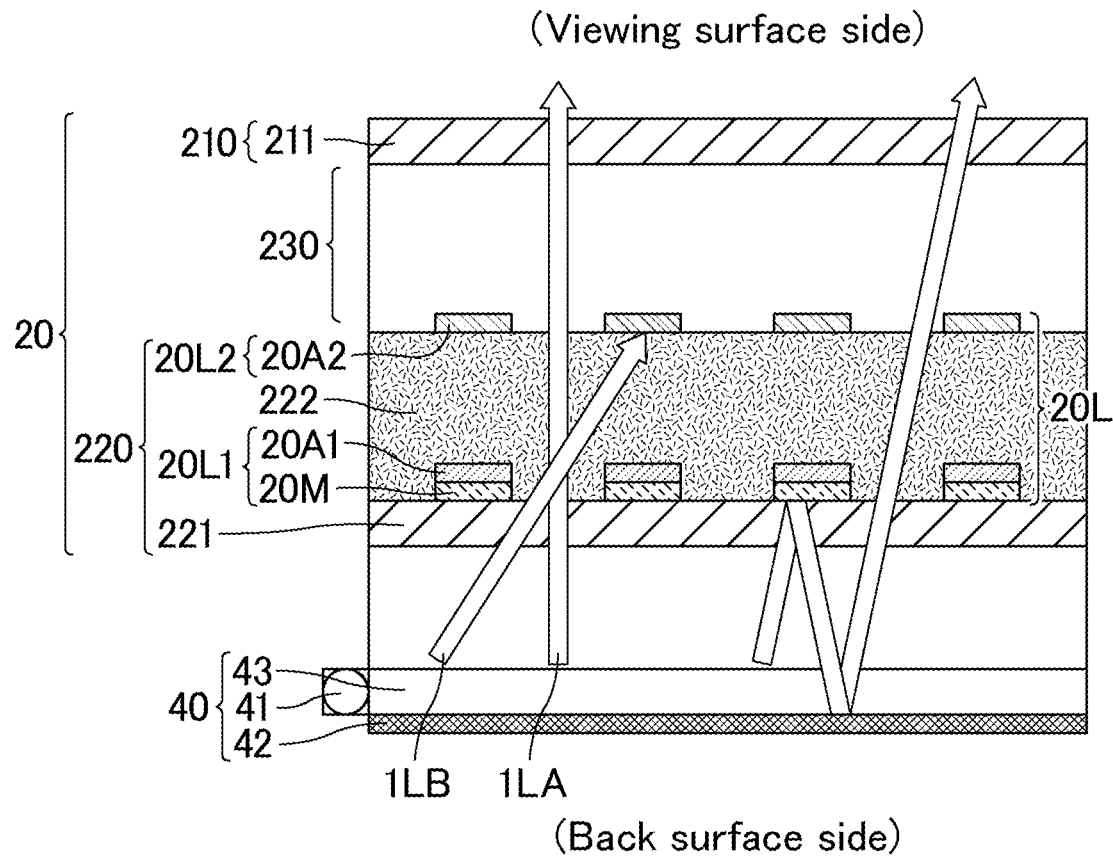
FIG. 6 is a schematic cross-sectional view showing light emitted from a backlight of the liquid crystal display device of Embodiment 1.

FIG. 2 is a schematic cross-sectional view showing a wide viewing angle mode of the liquid crystal display device of Embodiment 1. FIG. 3 is an enlarged schematic cross-sectional view showing the wide viewing angle mode of the liquid crystal display device of Embodiment 1. FIG. 4 is a schematic cross-sectional view showing a narrow viewing angle mode of the liquid crystal display device of Embodiment 1. FIG. 5 is an enlarged schematic cross-sectional view showing the narrow viewing angle mode of the liquid crystal display device of Embodiment 1. FIG. 6 is a schematic cross-sectional view showing light emitted from a backlight of the liquid crystal display device of Embodiment 1.

As illustrated in FIGS. 2 to 6, a liquid crystal display device 1 of the present embodiment includes a liquid crystal panel 20 and a display panel 10 that displays an image. This structure achieves the liquid crystal display device 1 capable of controlling a viewing angle with a reduced thickness.

More specifically, the liquid crystal display device 1 of the present embodiment further includes a backlight 40, and the display panel 10 is a liquid crystal display panel 10LC. This structure achieves the liquid crystal display device 1 capable of displaying an image of the liquid crystal display panel 10LC using light from the backlight 40 and controlling a viewing angle with a reduced thickness.

The liquid crystal panel 20 includes a louver layer 20L and PDLC 230. Thus, as illustrated in FIG. 6, oblique light 1LB from the back surface side (specifically the backlight 40) is blocked by the louver layer 20L, and only front light 1LA enters the PDLC 230. In the scattering state in which no voltage is applied to the PDLC 230, the front light 1LA incident on the PDLC 230 is scattered by the PDLC 230, as illustrated in FIGS. 2 and 3. Consequently, light from the back surface side (specifically the backlight 40) can be transmitted through a region ranging from a low polar angle side to a high polar angle side, and thus, a wide viewing angle mode (public mode) can be obtained. In the transmissive state in which voltage is applied to the PDLC 230, front light 1LA incident on the PDLC 230 passes through the PDLC 230 without change, as illustrated in FIGS. 4 and 5.

Consequently, light from the back surface side (specifically the backlight 40) is not transmitted through the high polar angle side and can be transmitted only through the low polar angle side, and thus, a narrow viewing angle mode (privacy mode) can be obtained. In this manner, the use of the liquid crystal panel 20 of the present embodiment enables control of the viewing angle.

As described above, the liquid crystal panel 20 of the present embodiment has a louver function in addition to the function of switching between the transmissive state and the scattering state. Thus, as compared to the liquid crystal display device 1R of the comparative example individually including the liquid crystal panel 20R capable of switching between the transmissive state and the scattering state and the louver layer 30R, the present embodiment can reduce the thickness, weight, and manufacturing costs of the liquid crystal display device 1. Structures of the present embodiment will be described in further detail.

As illustrated in FIGS. 2 and 4, specifically, the liquid crystal display device 1 of the present embodiment includes, sequentially from the viewing surface side toward the back surface side, the liquid crystal display panel 10LC as the display panel 10, the liquid crystal panel 20, and the backlight 40. With this structure, light from the backlight 40 enters the liquid crystal display panel 10LC after passing through the liquid crystal panel 20, and thus, light from the backlight 40 is allowed to enter the liquid crystal display panel 10LC in a region ranging from the low polar angle side to the high polar angle side in the wide viewing angle mode, and allowed to enter the liquid crystal display panel 10LC only at the low polar angle side in the narrow viewing angle mode.

As illustrated in FIGS. 1 to 6, the liquid crystal panel 20 includes, sequentially from the viewing surface side toward the back surface side, the first substrate 210, the PDLC 230, and the second substrate 220. The first substrate 210 includes, sequentially from the viewing surface side toward the back surface side, a first support substrate 211 and a first electrode 212. The second substrate 220 includes, sequentially from the back surface side toward the viewing surface side, a second support substrate 221, the first light-shielding portions 20L1, an insulating layer 222, the second light-shielding portions 20L2, and a second electrode 223. The first light-shielding portions 20L1 and the second light-shielding portions 20L2 serve as the louver layer 20L. A layer in which the first light-shielding portions 20L1 are provided will be also referred to as a first light-shielding layer, and a layer in which the second light-shielding portions 20L2 are provided will be also referred to as a second light-shielding layer. The PDLC 230 includes a polymer network 231 and liquid crystal components 232 dispersed in the polymer network 231.

In the manner described above, the liquid crystal panel 20 includes the PDLC 230 capable of controlling scattering and transmission of light and the louver layer 20L capable of narrowing light from the backlight 40 to a narrow viewing angle, between two support substrates (i.e., the first support substrate 211 and the second support substrate 221).

Figure 7:
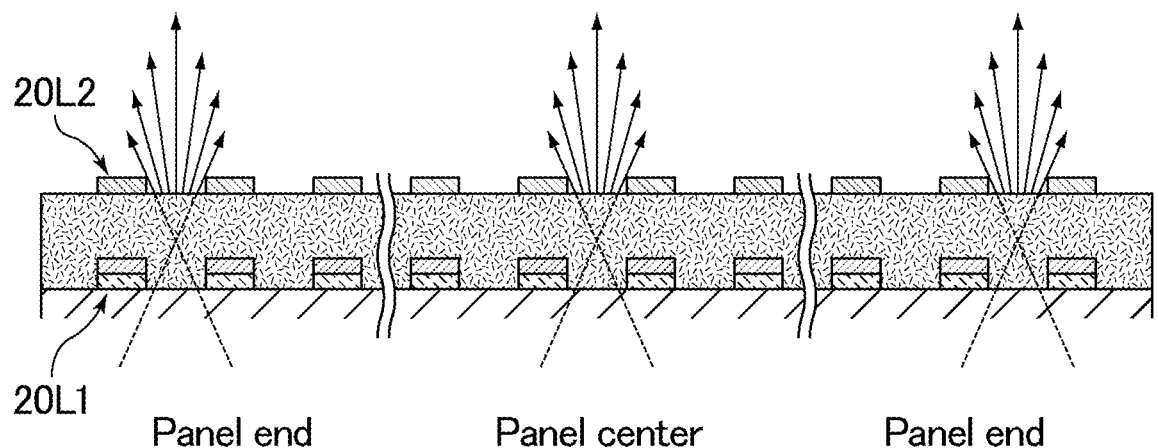
FIG. 7 is an example of a schematic cross-sectional view showing alignment characteristics of a liquid crystal panel of Embodiment 1.
Figure 8:
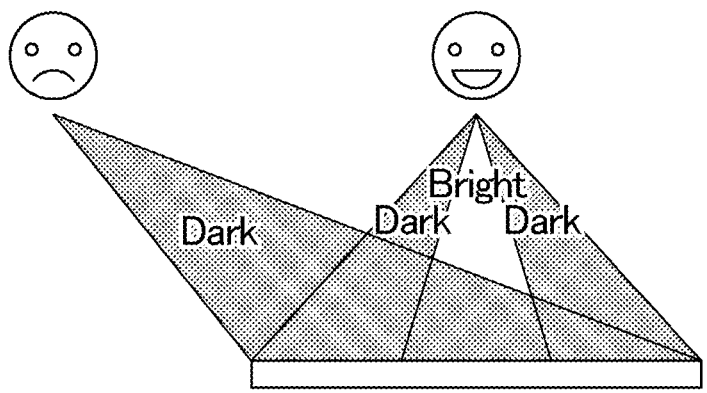
FIG. 8 is a schematic view showing viewing angle characteristics obtained by the structure of FIG. 7.
Figure 9:
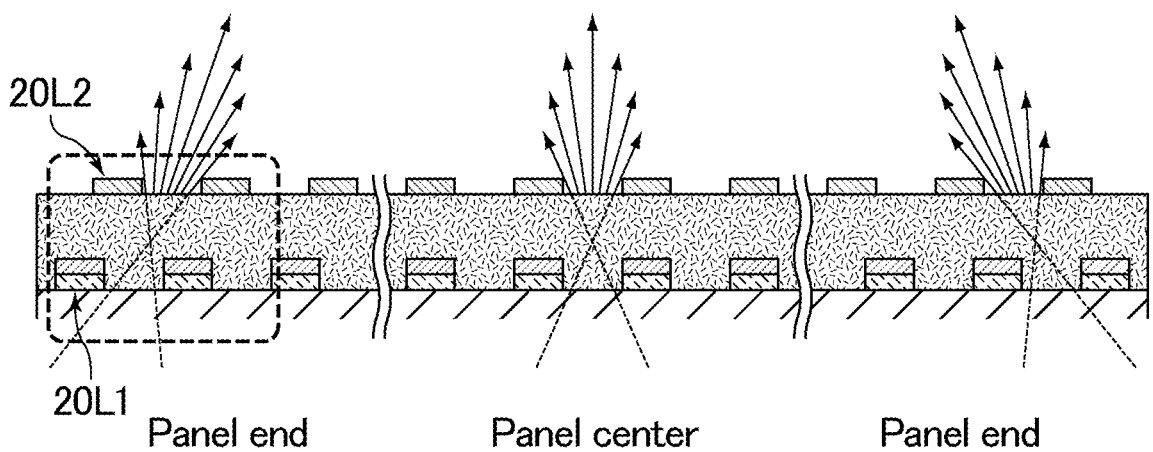
FIG. 9 is an example of a schematic cross-sectional view showing alignment characteristics of the liquid crystal panel of Embodiment 1.
Figure 10:
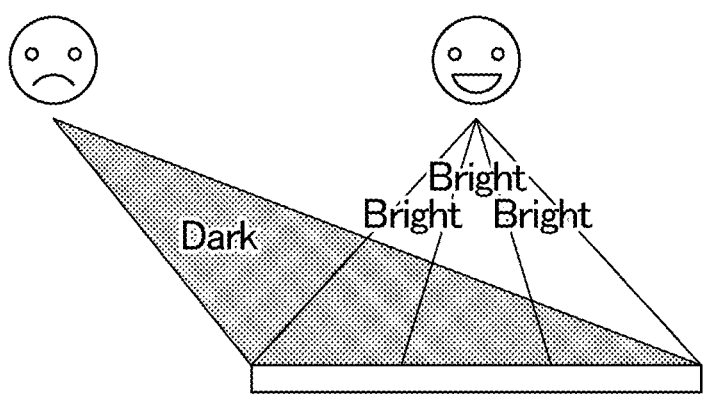
FIG. 10 is a schematic view showing viewing angle characteristics obtained by the structure of FIG. 9.

FIGS. 7 and 9 are examples of a schematic cross-sectional view showing alignment characteristics of the liquid crystal panel of Embodiment 1. FIGS. 8 and 10 are schematic views showing viewing angle characteristics obtained by the structures of FIGS. 7 and 9, respectively. In the liquid crystal panel 20 of the present embodiment, as illustrated in FIG. 7, luminance in the panel center direction decreases in panel ends, and as illustrated in FIG. 8, luminance unevenness in which the left and right sides become dark when seen in the panel center direction can occur. However, as illustrated in a region enclosed by the broken line in FIG. 9, when arrangement of the first light-shielding portions 20L1 and the second light-shielding portions 20L2 is adjusted to obtain alignment characteristics tilted toward the panel center, luminance in the panel center direction is enhanced to reduce luminance unevenness as illustrated in FIG. 10, for example, darkening in the left and right sides when seen in the panel center direction can be avoided. In this manner, the liquid crystal panel 20 of the present embodiment has an in-plane light distribution direction variable structure capable of reducing luminance unevenness by adjusting arrangement of the first light-shielding portions 20L1 and the second light-shielding portions 20L2 included in the louver layer 20L to change the light distribution direction in the plane.

For example, in a plan view, the first light-shielding portions 20L1 are arranged at the same positions as the second light-shielding portions 20L2. With this structure, in the louver layer 20L, light from the back surface side (specifically light from the backlight 40) can be more effectively narrowed to a narrow viewing angle. The expression that light-shielding portions (e.g., the first light-shielding portions 20L1) are arranged at the same positions as other light-shielding portions (e.g., the second light-shielding portions 20L2) means that each of the light-shielding portions (e.g., the first light-shielding portions 20L1) at least partially overlaps, preferably completely overlaps, a corresponding different light-shielding portion (e.g., corresponding second light-shielding portion 20L2).

For example, in a plan view, arrangement of the second light-shielding portions 20L2 relative to the first light-shielding portions 20L1 is different between a panel center and a panel end. This structure can reduce luminance unevenness in the panel end when seen from the panel center.

In a plan view, preferably, the first light-shielding portions 20L1 are located at the same positions as the second light-shielding portions 20L2 in the panel center, whereas the first light-shielding portions 20L1 are shifted from the second light-shielding portions 20L2 in the panel end. This structure can effectively reduce luminance unevenness in the panel end when seen from the panel center.

In this manner, the liquid crystal panel 20 of the present embodiment has the structure also capable of changing in-plane light distribution direction by adjusting arrangement of the first light-shielding portions 20L1 and the second light-shielding portions 20L2 to prevent luminance unevenness when seen from an arbitrary position in the narrow viewing angle mode. For example, as illustrated in FIGS. 9 and 10, the light-shielding portions are arranged such that the light distribution direction in the left and right ends of the panel is tilted toward the center. In this case, the left and right sides do not become dark when seen from the panel center in the narrow viewing angle mode without degradation of privacy protection (with the contents displayed on the screen kept unobservable from the outside of the panel) so that luminance unevenness can be reduced.

Figure 11:
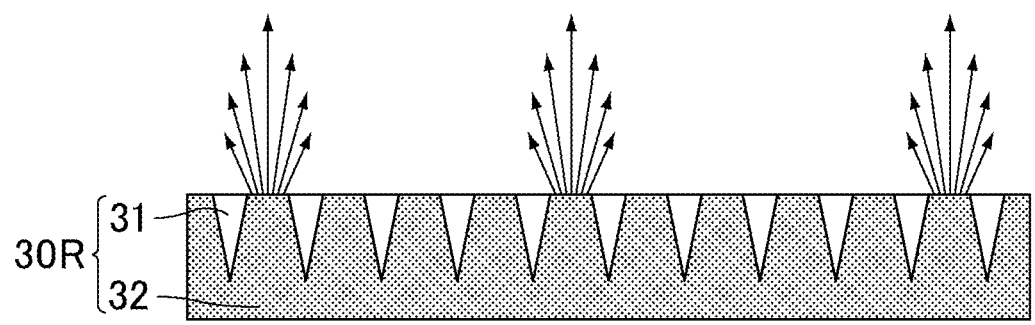
FIG. 11 is an example of a schematic cross-sectional view showing alignment characteristics of a liquid crystal display device of a comparative example.

FIG. 11 is an example of a schematic cross-sectional view showing alignment characteristics of the liquid crystal display device of the comparative example. As illustrated in FIG. 11, the liquid crystal display device of the comparative example includes the louver layer 30R including an absorbent member as the light-shielding layers 31 and a transparent substrate as the transparent layers 32. In the liquid crystal display device of the comparative example, light incident on the absorbent member of the louver layer 30R in light emitted from the backlight is absorbed by the absorbent member, and thus, luminance of the liquid crystal display device decreases.

As illustrated in FIG. 11, in the liquid crystal display device of the comparative example including the louver layer 30R, since light distribution direction is uniformly oriented perpendicularly to the display surface in the narrow viewing angle mode, the left and right sides become dark and luminance unevenness occurs when seen from the screen center, for example. However, JP H09-197405 A that discloses the liquid crystal display device of the comparative example does not show any of an issue of luminance unevenness and measures against such luminance unevenness. It is supposed to be difficult to change the light distribution direction in the plane with the structure of the liquid crystal display device disclosed in JP H09-197405 A.

Figure 12:
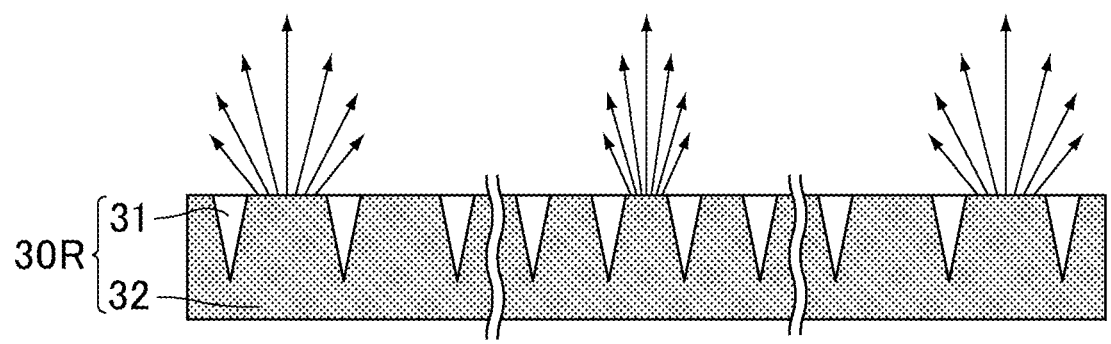
FIG. 12 is a schematic cross-sectional view showing a pitch of a louver layer included in the liquid crystal display device of the comparative example.

FIG. 12 is a schematic cross-sectional view showing a pitch of a louver layer included in the liquid crystal display device of the comparative example. As illustrated in FIG. 12, luminance unevenness can be reduced by increasing the pitch of the light-shielding layers 31 in the left and right ends of the screen, but in this case, the viewing angle enlarges to the outside of the screen and privacy protection degrades.

The louver layer 20L preferably includes two or more layers of light-shielding portions (the first light-shielding portions 20L1 and the second light-shielding portions 20L2 in the present embodiment) sandwiching an insulating layer 222 (e.g., organic insulating film). That is, the liquid crystal panel 20 of the present embodiment preferably includes the insulating layer 222 between the first light-shielding portions 20L1 and the second light-shielding portions 20L2. The light-shielding portions are made of, for example, a blackened metal, but the thickness of a metal that can be formed in a normal process is about 0.5 μm, and it is difficult to form a thickness (several micrometers to several tens of micrometers) necessary for the louver function. In view of this, in the present embodiment, the louver layer 20L has the structure including two or more layers of light-shielding portions sandwiching the insulating layer 222 so that the louver function can be thereby achieved within the range of a normal process. In the present embodiment, the viewing angle controlling cell in which the PDLC 230 and the louver layer 20L are united can reduce the thickness, weight, and manufacturing costs, as compared to a structure in which the liquid crystal panel including PDLC and the louver layer are individually provided.

Each of the first light-shielding portions 20L1 preferably includes a first light-absorbing layer 20A1. With this structure, light can be absorbed by the first light-shielding portions 20L1 and blocked. Each of the second light-shielding portions 20L2 preferably includes a second light-absorbing layer 20A2. With this structure, light can be absorbed by the second light-shielding portions 20L2 and blocked.

Each of the first light-absorbing layer 20A1 and the second light-absorbing layer 20A2 (hereinafter referred to simply as light-absorbing layers) is preferably made of a material whose absorptance is higher than a reflection factor thereof with respect to light incident from the back surface side (e.g., backlight illumination), and an absorptance to backlight illumination is preferably 80% or higher, for example. Examples of the light-absorbing layer include a metal oxide film and a resin film. Examples of the metal oxide film include a bilayer of chromium (Cr) and chromium oxide (CrOx). Examples of the resin film include a black resist. The black resist is preferably a black photosensitive resin and is, for example, a black acrylic resin.

As illustrated in FIG. 6, each of the first light-shielding portions 20L1 preferably includes a reflective surface 20M at a surface on the back surface side (specifically on the backlight 40 side). With this structure, light from the back surface side (specifically light from the backlight 40) can be reflected by the reflective surface 20M toward the back surface side. In addition, in a case where the backlight 40 includes the reflective sheet 42, reflected light from the reflective surfaces 20M can be reflected toward the viewing surface side again by the reflective sheet 42, and light from the backlight 40 can be recycled. As a result, decrease in luminance can be suppressed.

Figure 13:
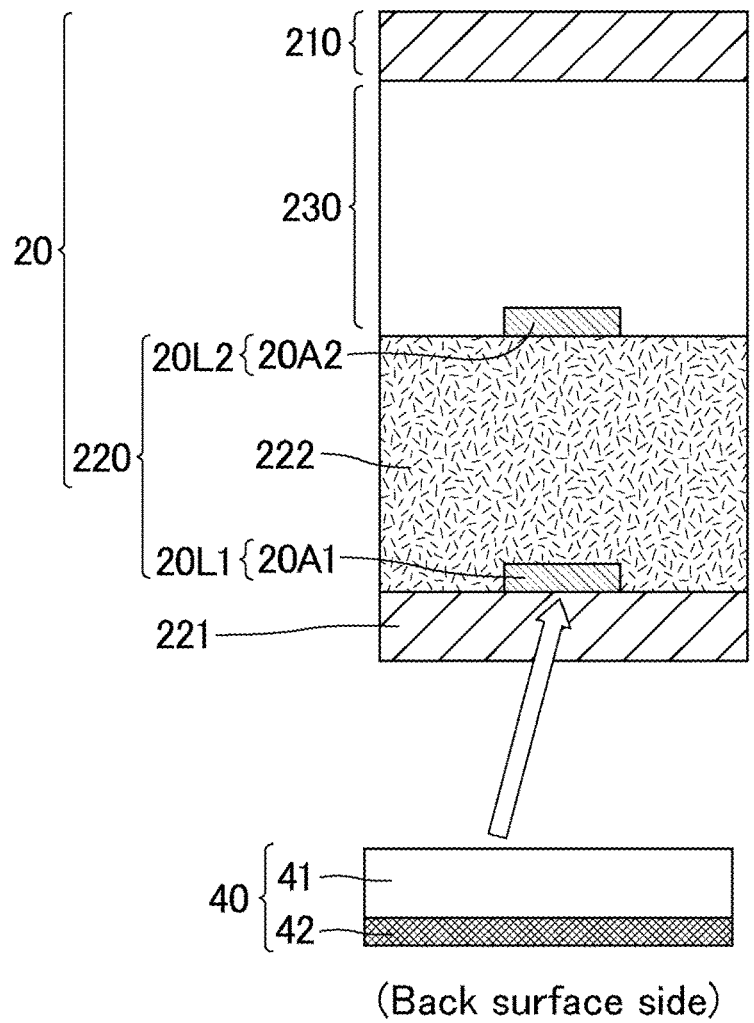
FIG. 13 is a schematic cross-sectional view showing a case where entire light-shielding portions included in the liquid crystal panel of Embodiment 1 are constituted by a light-absorbing layer.

FIG. 13 is a schematic cross-sectional view showing a case where entire light-shielding portions included in the liquid crystal panel of Embodiment 1 are constituted by a light-absorbing layer. As illustrated in FIG. 13, in a case where the entire first light-shielding portions 20L1 are formed of the first light-absorbing layer 20A1, a film surface on the second support substrate 221 side cuts out all the light incident on the first light-absorbing layer 20A1, including light oblique to the display surface and light in the direction normal to the display surface that does not originally need to be cut in light incident from the back surface side (specifically light from the backlight 40), resulting in a decrease of luminance. In view of this, each of the first light-shielding portions 20L1 includes the reflective surface 20M that reflects light at the surface on the back surface side (specifically on the backlight 40 side) so that light can be recycled between the reflective surfaces 20M and the reflective sheet 42 provided in the backlight 40, and thereby, the decrease of luminance can be suppressed.

The reflective surfaces 20M are preferably disposed to face the backlight 40. With the reflective surfaces 20M, light incident on the light-shielding region such as the first light-shielding portions 20L1 in the backlight illumination incident on the liquid crystal panel 20 is reflected on the reflective surfaces 20M, and caused to return toward the backlight 40. Light reflected on the reflective surfaces 20M is reflected on the reflective sheet 42 included in the backlight 40 and emitted toward the liquid crystal panel 20 again, and thus, efficiency of utilization of backlight illumination can be enhanced.

The reflective surfaces 20M are preferably formed directly on the second support substrate 221, but an interlayer insulating layer may be disposed between the second support substrate 221 and the reflective surfaces 20M. In a plan view, the reflective surfaces 20M are preferably formed in a region overlapping the first light-shielding portions 20L1.

Examples of a material for the reflective surface 20M include a highly reflective metal such as aluminum (Al), silver (Ag), and an alloy (APC) of silver, palladium (Pd), and copper (Cu). Examples of the material also include a dielectric multilayer film (high reflective film) in which a high refractive index film such as $Ta_2O_3$ and a low refractive index film such as $MgF_2$ are laminated and a film in which the highly reflective metal and a high reflective film are laminated. The reflective surface 20M can be formed by forming a metal film by a technique such as deposition or spattering and then patterning the metal film, for example. The reflective surface 20M has a reflectance of 90% or more and 100% or less, for example.

In a manner similar to the first light-shielding portions 20L1, each of the second light-shielding portions 20L2 may include a reflective surface at a surface on the back surface side (specifically the backlight 40 side). With this structure, light from the back surface side (specifically light from the backlight 40) can be reflected by the reflective surface toward the back surface side. In addition, in a case where the backlight 40 includes the reflective sheet 42, reflected light from the reflective surface can be reflected toward the viewing surface side again by the reflective sheet 42, and light from the backlight 40 can be recycled. As a result, decrease in luminance can be suppressed.

Each of the first light-shielding portions 20L1 more preferably includes the first light-absorbing layer 20A1, and the reflective surface 20M overlapping the first light-absorbing layer 20A1 and located at the surface on the back surface side (specifically the backlight 40 side) of the first light-absorbing layer 20A1. With this structure, light from the back surface side to be absorbed in the first light-absorbing layer 20A1 (specifically light from the backlight 40) can be reflected by the reflective surface 20M toward the back surface side. In addition, in a case where the backlight 40 includes the reflective sheet 42, reflected light from the reflective surface 20M can be reflected toward the viewing surface side again by the reflective sheet 42, so that light from the backlight 40 can be recycled. As a result, decrease in luminance can be suppressed.

Similarly, each of the second light-shielding portions 20L2 may include the second light-absorbing layer 20A2, and the reflective surface overlapping the second light-absorbing layer 20A2 and located at the surface on the back surface side (specifically the backlight 40 side) of the second light-absorbing layer 20A2. With this structure, light from the back surface side to be absorbed in the second light-absorbing layer 20A2 (specifically light from the backlight 40) can be reflected by the reflective surface toward the back surface side. In addition, in a case where the backlight 40 includes the reflective sheet 42, reflected light from the reflective surface can be reflected toward the viewing surface side again by the reflective sheet 42, and light from the backlight 40 can be recycled. As a result, decrease in luminance can be suppressed.

Figure 14:
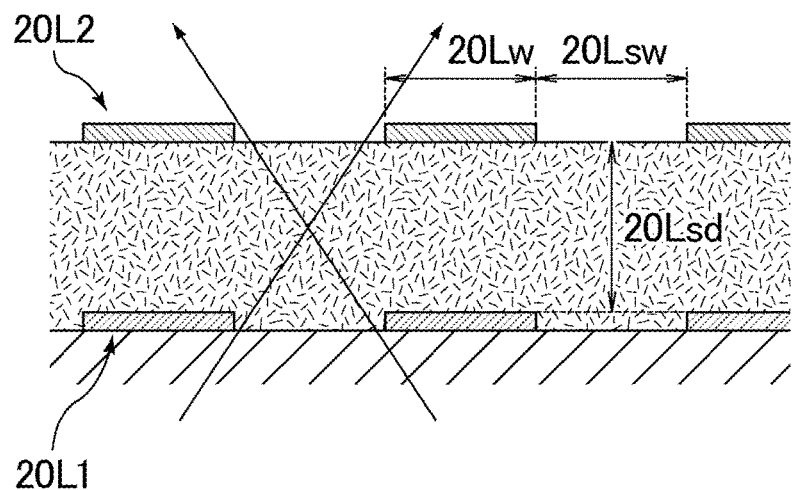
FIG. 14 is a schematic cross-sectional view showing a structure of a louver layer included in the liquid crystal panel of Embodiment 1.

FIG. 14 is a schematic cross-sectional view showing a structure of the louver layer included in the liquid crystal panel of Embodiment 1. Viewing angle performance of the louver layer 20L is determined mainly depending on a slit width 20Lsw and an inter-slit distance 20Lsd. The slit width 20Lsw refers to a distance between adjacent first light-shielding portions 20L1 and a distance between adjacent second light-shielding portions 20L2. The inter-slit distance 20Lsd refers to a distance between the first light-shielding portions 20L1 and the second light-shielding portions 20L2.

The slit width 20Lsw is preferably as small as possible. The slit width 20Lsw is preferably 1 μm or more and 10 μm or less, for example. This structure can narrow the viewing angle.

The inter-slit distance 20Lsd is preferably 1 μm or more and 30 μm or less, more preferably 3 μm or more and 10 μm or less. With this structure, a normal process for manufacturing liquid crystal panels (typically within 10 μm) can be employed, and the viewing angle can be narrowed.

The width (light-shielding width 20Lw) of each of the first light-shielding portions 20L1 and the second light-shielding portions 20L2 is preferably as small as possible. The width of each of the first light-shielding portions 20L1 and the second light-shielding portions 20L2 is preferably 1 μm or more and 5 μm or less, for example. This structure can increase transmittance in the louver layer 20L.

The slit width 20Lsw and the light-shielding width 20Lw may be equal to or different from each other. For example, each of the slit width 20Lsw and the light-shielding width 20Lw may be 4 μm, or the slit width 20Lsw may be 4 μm and the light-shielding width 20Lw may be 8 μm.

Figure 15:
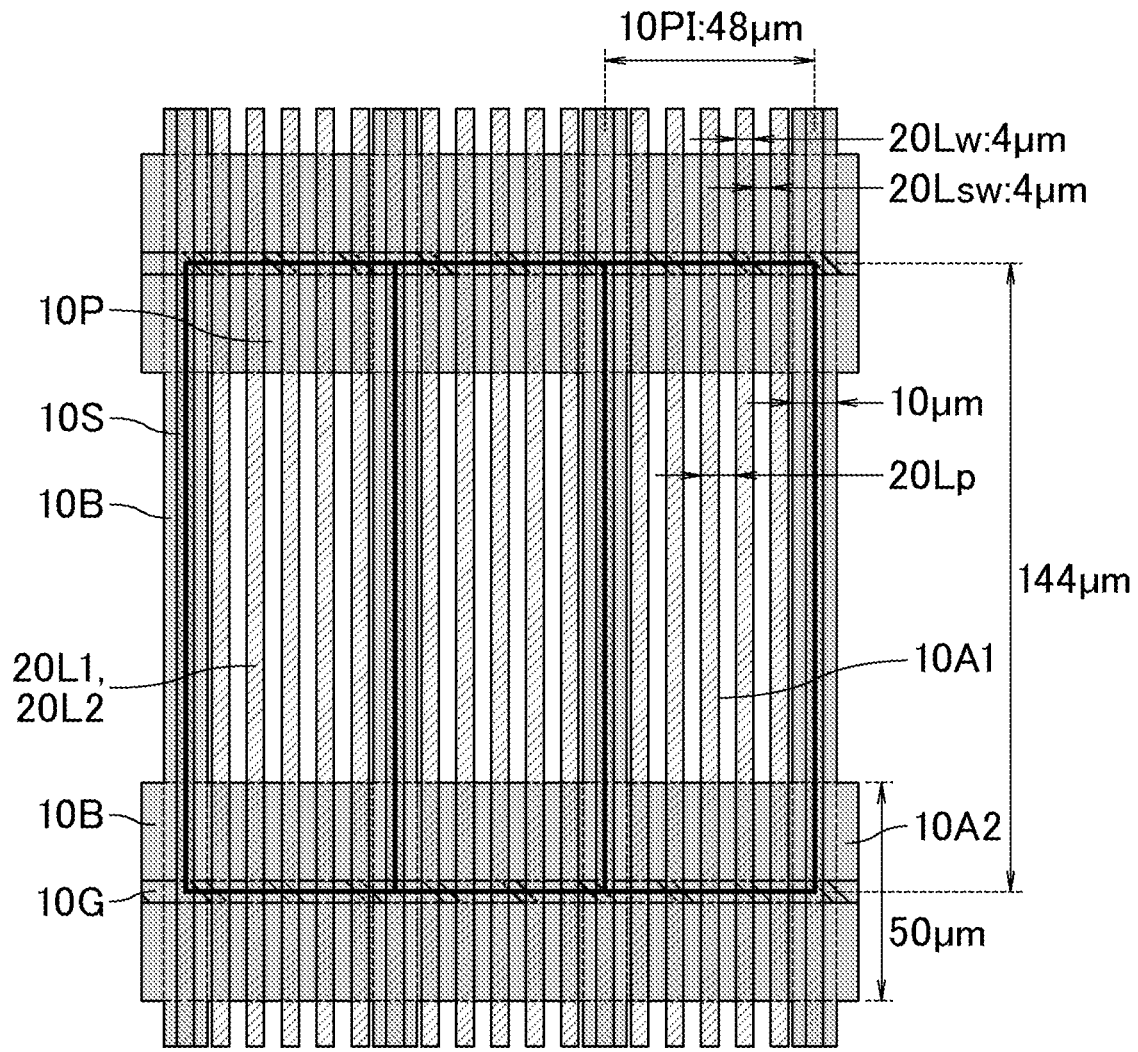
FIG. 15 is a schematic plan view in which a display panel and the louver layer included in the liquid crystal display device of Embodiment 1 are layered.

FIG. 15 is a schematic plan view in which the display panel and the louver layer included in the liquid crystal display device of Embodiment 1 are layered. The display panel 10 of the present embodiment includes gate lines 10G extending parallel to one another and source lines 10S extending parallel to one another in a direction intersecting with the gate lines 10G with an insulating film interposed therebetween. The display panel 10 includes a BM layer 10B in regions overlapping the gate lines 10G and regions overlapping the source lines 10S. The width of the BM layer 10B in the regions overlapping with the gate lines 10G is, for example, 50 μm. The width of the BM layer 10B in the regions overlapping the source lines 10S is, for example, 10 μm.

The gate lines 10G extend in one of the left-right direction of the screen (direction of 0°-180° azimuth) and top-bottom direction of the screen (direction of 90°-270° azimuth), and the source lines 10S extend in the other of the left-right direction and the top-bottom direction of the screen. The gate lines 10G and the source lines 10S are partially bent or arranged in a zigzag pattern (e.g., zigzag pattern forming an angle of ±10° with respect to the direction of 90°-270° azimuth) microscopically (on a per-pixel level), but extend in the top-bottom direction or the left-right direction of the screen macroscopically.

The light-shielding portions (e.g., the first light-shielding portions 20L1) may extend in the same direction as the gate lines 10G or the source lines 10S. The expression that the light-shielding portions extend in the same direction as the gate lines 10G or the source lines 10S means that the light-shielding portions extend in the same single direction macroscopically. Specifically, even if the gate lines 10G or the source lines 10S are bent or arranged in a zigzag pattern microscopically, the light-shielding portions are arranged linearly in the left-right direction or the top-bottom direction of the screen.

In the case where the light-shielding portions extend in the left-right direction of the screen, the viewing angle in the top-bottom direction of the screen can be controlled (narrowed). In the case where the light-shielding portions extend in the top-bottom direction of the screen, the viewing angle in the left-right direction of the screen can be controlled (narrowed).

If a slit pitch 20Lp that is the sum of the light-shielding width 20Lw and the slit width 20Lsw is large, the louver layer 20L appears as vertical stripes or interferes with a pixel pitch 10PI of the display panel 10 to cause moire. Thus, preferably, the display panel 10 includes pixels 10P arranged in a matrix pattern and, with the distance between adjacent first light-shielding portions 20L1 being defined as a slit width 20Lsw of the first light-shielding portions 20L1, the width of each of the first light-shielding portions 20L1 in the lateral direction being defined as a light-shielding width 20Lw of the first light-shielding portions 20L1, and the sum of the slit width 20Lsw of the first light-shielding portions 20L1 and the light-shielding width 20Lw of the first light-shielding portions 20L1 being defined as a slit pitch 20Lp of the first light-shielding portions 20L1, the pixel pitch 10PI of the pixels 10P is an integral multiple of the slit pitch 20Lp of the first light-shielding portions 20L1. This structure can reduce appearance of the louver layer 20L in a vertical stripe pattern and occurrence of moire. Similarly, in the second light-shielding portions 20L2, the pixel pitch 10PI of the pixels 10P is preferably an integral multiple of the slit pitch 20Lp of the second light-shielding portions 20L2.

Since the first light-shielding portions 20L1 and the second light-shielding portions 20L2 extend, the direction of this extension is a longitudinal direction, and the direction orthogonal to the longitudinal direction is a lateral direction. Specifically, as illustrated in FIG. 15, since the first light-shielding portions 20L1 and the second light-shielding portions 20L2 extend in the same direction as the source lines 10S, the longitudinal direction of the first light-shielding portions 20L1 and the second light-shielding portions 20L2 is the same as the extension direction of the source lines 10S, and the lateral direction of the first light-shielding portions 20L1 and the second light-shielding portions 20L2 is the same as the extension direction of the gate lines 10G. Each of the pixels 10P is a region surrounded by two adjacent gate lines 10G and two adjacent source lines 10S. The pixel pitch 10PI is a width of the pixels 10P in the same direction as the direction of the light-shielding width 20Lw (lateral direction of the first light-shielding portions 20L1 and the second light-shielding portions 20L2).

As illustrated in FIG. 15, in a case where the width of the pixels 10P in the extension direction of the gate lines 10G (pixel pitch 10PI) is 48 μm and the width of the pixels 10P in the extension direction of the source lines 10S is 144 μm, the slit pitch 20Lp is preferably 8 μm, 9.6 μm, 12 μm, 16 μm, 24 μm, or 48 μm. The light-shielding width 20Lw is preferably 3 μm or more and 40 μm or less, more preferably 3 μm or more and 10 μm or less. The slit width 20Lsw is preferably 3 μm or more and 40 μm or less, more preferably 3 μm or more and 10 μm or less. In a case where the slit pitch 20Lp is 8 μm, the light-shielding width 20Lw can be set at 4 μm and the slit width 20Lsw can be set at 4 μm, for example.

The slit width 20Lsw of the first light-shielding portions 20L1 may be equal to or different from the slit width 20Lsw of the second light-shielding portions 20L2, and in the description of the present embodiment, these slit widths are equal.

The light-shielding width 20Lw of the first light-shielding portions 20L1 may be equal to or different from the light-shielding width 20Lw of the second light-shielding portions 20L2, and in the description of the present embodiment, these slit widths are equal.

The slit pitch 20Lp of the first light-shielding portions 20L1 may be equal to or different from the slit pitch 20Lp of the second light-shielding portions 20L2, and in the description of the present embodiment, these slit pitches are equal.

The first support substrate 211 and the second support substrate 221 are preferably transparent substrates such as glass substrates or plastic substrates.

The first electrode 212 and the second electrode 223 are solid electrodes covering the entire screen. This structure enables switching between the public mode and the privacy mode in the entire screen. The first electrode 212 and the second electrode 223 may be transparent electrodes, and can be formed of a transparent conductive material such as indium tin oxide (ITO), indium zinc oxide (IZO), zinc oxide (ZnO), or tin oxide (SnO), or an alloy of any of these materials.

The insulating layer 222 may be an organic insulating film, an inorganic insulating film, or a laminate of the organic insulating film and the inorganic insulating film. Examples of the organic insulating film include an organic film (relative dielectric constant $\varepsilon$=2 to 5) such as acrylic resin, polyimide resin, or novolak resin, or a laminate of any of these films. The thickness of the organic insulating film is not limited and is, for example, 2 µm or more and 4 µm or less. Example of the inorganic insulating film include an inorganic film (relative dielectric constant $\varepsilon$=5 to 7) such as silicon nitride (SiNx) or silicon oxide ($SiO_2$) and a laminate of any of these films. The thickness of the inorganic insulating film is, for example, 1500 Å or more and 3500 Å or less.

The thickness of the insulating layer 222 is preferably 1 µm or more and 30 µm or less. This structure provides the louver layer 20L with the louver function within the range of a normal process. The thickness of the insulating layer 222 is more preferably 2 µm or more and 20 µm or less, still more preferably 3 µm or more and 10 µm or less.

The PDLC 230 includes the polymer network 231 and the liquid crystal components 232, and is sandwiched between the first substrate 210 and the second substrate 220. In the PDLC 230, fibrous matrices of a cured product of a photopolymerizable liquid crystal compound are aggregated to form a three-dimensionally continuous polymer network, and liquid crystal components are phase-separated within the polymer network.

The PDLC 230 includes the polymer network 231 made of a cured product of a photopolymerizable liquid crystal compound, and the liquid crystal components 232, and is in the scattering state during no voltage application and in the transmissive state during voltage application. The expression of during no voltage application means a state where voltage applied to the PDLC 230 is less than a threshold voltage (including application of no voltage), and the expression of during voltage application means a state where the voltage applied to the PDLC 230 is the threshold voltage or more. The state where no voltage is applied herein will be also referred to as a no-voltage application state, and the state where voltage is applied will be also referred to as a voltage application state.

As illustrated in FIG. 3, during no voltage application, alignment azimuths of the polymer network 231 and the liquid crystal components 232 are preferably different from each other. With this structure, during no voltage application, a refractive index difference in extraordinary refractive index ne between the polymer network 231 and the liquid crystal components 232 and a refractive index difference in ordinary refractive index no between the polymer network 231 and the liquid crystal components 232 are large in every direction including the thickness direction of the PDLC 230. Thus, light incident on the liquid crystal panel 20 is scattered in the PDLC 230, and the scattering state can be obtained. The state where the refractive index difference in extraordinary refractive index ne between the polymer network 231 and the liquid crystal components 232 and the refractive index difference in ordinary refractive index no between the polymer network 231 and the liquid crystal components 232 are large in every direction including the thickness direction of the PDLC 230 is also regarded as a state where refractive index mismatching between the polymer network 231 and the liquid crystal components 232 is found.

The scattering state is a state in which light is scattered. For example, light transmittance of the PDLC 230 in the scattering state may be 10% or less, and may be 8% or less. The light transmittance of the PDLC 230 in the scattering state may be 0% or more. A haze indicating a light scattering rate of the PDLC 230 in the scattering state varies depending on applied voltage, and may be, for example, 80% or more, and may be 90% or more. The haze indicating a light scattering rate of the PDLC 230 in the scattering state may be 100% or less. In the present embodiment, the PDLC 230 in the scattering state scatters visible light. Thus, the PDLC 230 in the scattering state is in a state similar to the state of frosted glass. The haze herein is measured by a method in conformity with JIS K 7136. To measure the haze, a halogen lamp can be used as a light source with, for example, a turbidimeter "Haze Meter NDH2000" available from Nippon Denshoku Industries Co., Ltd.

As illustrated in FIG. 5, during voltage application, alignment azimuths of the polymer network 231 and the liquid crystal components 232 are preferably substantially the same. With this structure, there are little refractive index difference in extraordinary refractive index ne between the polymer network 231 and the liquid crystal components 232 and little refractive index difference in ordinary refractive index no between the polymer network 231 and the liquid crystal components 232 in every direction including the thickness direction of the PDLC 230 during voltage application. Thus, light incident on the liquid crystal panel 20 passes through the PDLC 230, and the transmissive state can be obtained. The state where there are little refractive index difference in extraordinary refractive index ne between the polymer network 231 and the liquid crystal components 232 and little refractive index difference in ordinary refractive index no between the polymer network 231 and the liquid crystal components 232 in every direction including the thickness direction of the PDLC 230 is also regarded as a state where refractive index matching between the polymer network 231 and the liquid crystal components 232 is found.

The transmissive state is a state of being transparent to light. For example, the light transmittance of the PDLC 230 in the transmissive state may be 80% or more, and may be 90% or more. The light transmittance of the PDLC 230 in the transmissive state may be 100% or less. In the present embodiment, the PDLC 230 in the transmissive state is transparent to visible light.

The photopolymerizable liquid crystal compound for forming the polymer network 231 is in a liquid crystal phase and compatible with the liquid crystal components 232 at room temperature, and is phase-separated from the liquid crystal components 232 when being cured by UV application to form polymer.

Examples of the photopolymerizable liquid crystal compound include monomers having: a substituent (hereinafter also referred to as a mesogenic group) such as a biphenyl group, a terphenyl group, a naphthalene group, a phenyl benzoate group, an azobenzene group, and derivatives thereof; a photoreactive group such as a cinnamoyl group, a chalcone group, a cynnamylidene group, a β-(2-phenyl) acryloyl group, a cinnamate group, and derivatives thereof;

and a polymerizable group such as an acrylate, a methacrylate, a maleimide, an N-phenylmaleimide, and a siloxane. The polymerizable group is preferably an acrylate. The number of polymerizable groups per molecule of the photopolymerizable liquid crystal compound is not particularly limited, and is preferably one or two.

The liquid crystal components 232 may not include a polymerizable group such as an acrylate, a methacrylate, a maleimide, an N-phenylmaleimide, and a siloxane.

In the present embodiment, the liquid crystal components 232 may have a positive anisotropy of dielectric constant ($\Delta\varepsilon$) as defined by the following formula (L), and may have negative anisotropy of dielectric constant ($\Delta\varepsilon$). The liquid crystal components (liquid crystal molecules) having a positive anisotropy of dielectric constant are aligned in a direction parallel to the electric field direction, and the liquid crystal components (liquid crystal molecules) having a negative anisotropy of dielectric constant are aligned in a direction perpendicular to the electric field direction. The liquid crystal components (liquid crystal molecules) having a positive anisotropy of dielectric constant are also referred to as positive liquid crystals, and the liquid crystal components (liquid crystal molecules) having a negative anisotropy of dielectric constant are also referred to as negative liquid crystals. The long axis direction of the liquid crystal components (liquid crystal molecules) is the direction of the slow axis. The direction of the long axis of the liquid crystal components (liquid crystal molecules) during no voltage application is also referred to as the initial alignment direction of the liquid crystal components (liquid crystal molecules).

$\Delta\varepsilon$=(dielectric constant in long axis direction of liquid crystal components(liquid crystal molecules))−(dielectric constant in short axis direction of liquid crystal components(liquid crystal molecules))   (L)

As the liquid crystal components 232, a tolan-based liquid crystal material (liquid crystal material having a —C≡C— (carbon-carbon triple bond) as a linking group) can be used.

Preferably, the anisotropy $\Delta n$ of refractive index of the liquid crystal components 232 is 0.18 or more and 0.24 or less, the anisotropy $\Delta\varepsilon$ of dielectric constant of the liquid crystal components 232 is 15 or more and 25 or less, and a rotational viscosity $\gamma 1$ of the liquid crystal components 232 is 100 mPa·s or more and 300 mPa·s or less. This structure can achieve both strong scattering and low-voltage driving, and achieve a response speed substantially equal to that of a general liquid crystal display device including no polymer network. Such effects can be achieved by setting the anisotropy $\Delta n$ of refractive index, the anisotropy $\Delta\varepsilon$ of dielectric constant, and the rotational viscosity $\gamma 1$ of the liquid crystal components 232 all within the respective ranges described above.

Specific examples of the tolan-based liquid crystal material include liquid crystal materials having a structure represented by the following formula (L1).

   (L1)

In the formula, $Q_1$ and $Q_2$ each independently represent an aromatic ring group, X represents a fluorine group or a cyano group, and $n_1$ and $n_2$ each independently represent 0 or 1.

In formula (L1), $n_1$ and $n_2$ are not simultaneously zero. That is, the sum of $n_1$ and $n_2$ is 1 or 2.

In formula (L1), the aromatic ring group may have a substituent.

In formula (L1), $Q_1$ and $Q_2$ are preferably each independently a structure represented by any of the following formulas (L2-1) to (L2-7).

   (L2-1)

   (L2-2)

   (L2-3)

   (L2-4)

   (L2-5)

   (L2-6)

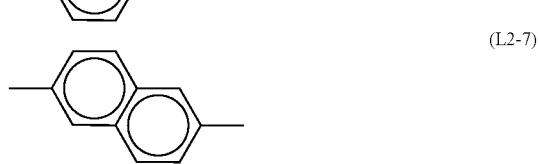   (L2-7)

Examples of the specific structures of the liquid crystal material having a structure represented by formula (L1) above include the following structures represented by chemical formulas (L1-1) to (L1-21) below.

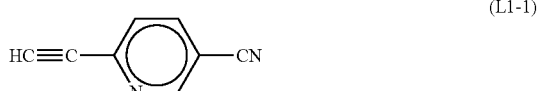   (L1-1)

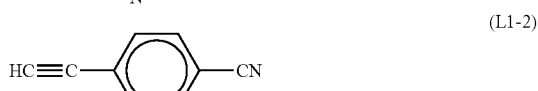   (L1-2)

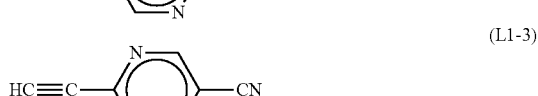   (L1-3)

   (L1-4)

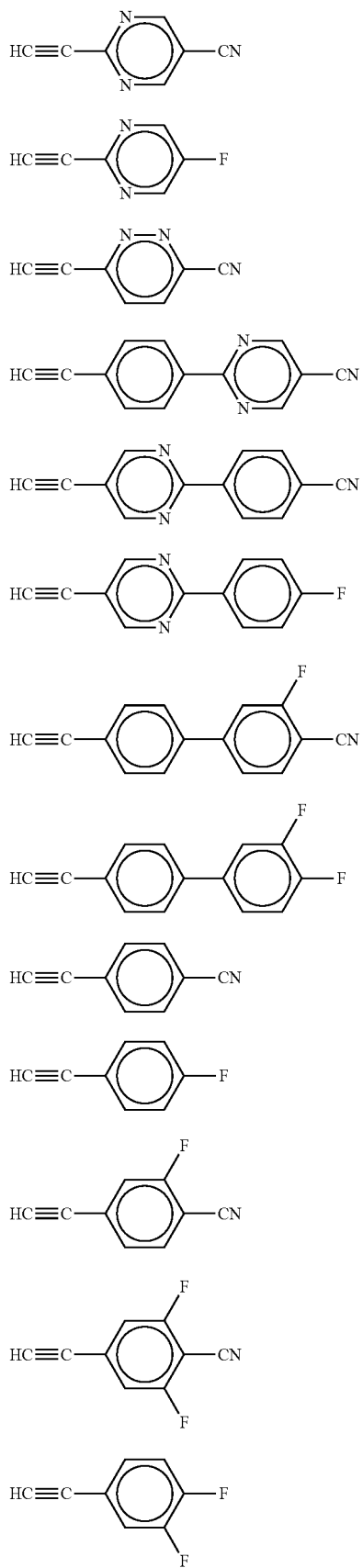
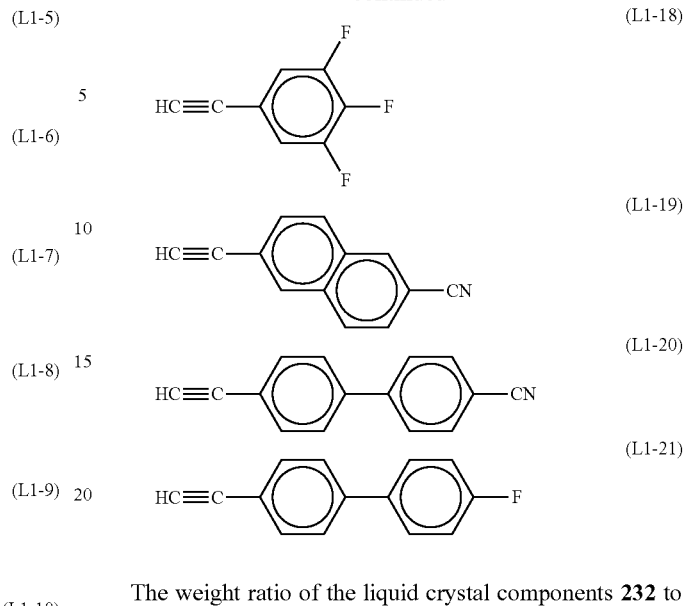

The weight ratio of the liquid crystal components 232 to the polymer network 231 (liquid crystal components:polymer network) is preferably from 90:10 to 97:3. In other words, preferably, the weight of the liquid crystal components 232 relative to the polymer network 231 is 90 or more and 97 or less; when the proportion by weight of the liquid crystal components 232 is 90 or more, the proportion by weight of the polymer network 231 is 10 or less, and when the proportion by weight of the liquid crystal components 232 is 97 or less, the proportion by weight of the polymer network 231 is 3 or more. This structure can effectively achieve both strong scattering and low-voltage driving. If the proportion by weight of the polymer network 231 exceeds 10, strong scattering is obtained but the driving voltage increases, and when the proportion by weight of the polymer network 231 is less than 3, the driving voltage is reduced but strong scattering may not be obtained.

The display panel 10 only needs to have the function of displaying an image. The display panel 10 is capable of turning image display on and off. In the present embodiment, the liquid crystal display panel 10LC will be described as an example of the display panel 10.

As illustrated in FIG. 15, the display panel 10 includes the pixels 10P arranged in a matrix pattern, and is divided into a display region (active area) 10A1 capable of displaying an image and a non-display region (non-active area) 10A2 which surrounds the display region 10A1 and is incapable of displaying an image. The gate lines 10G, the source lines 10S, and the BM layer 10B are located in the non-display region 10A2. The first light-shielding portions 20L1 and the second light-shielding portions 20L2 are located in a region overlapping the display region 10A1. This structure more effectively causes an image displayed on the display panel 10 to be less visually recognized from an oblique direction in the privacy mode. The first light-shielding portions 20L1 and the second light-shielding portions 20L2 may be located in the non-display region 10A2 as well as in the display region 10A1.

As illustrated in FIGS. 2 and 4, the display panel 10 includes, sequentially from the viewing surface side toward the back surface side, the color filter (CF) substrate 110 including the CF layers, the liquid crystal layer 130, and the thin-film transistor (TFT) substrate 120 including the TFTs.

The TFT substrate 120 includes an insulating substrate and, on the insulating substrate, the gate lines and the source lines in the display region. The gate lines extend parallel to one another, and the source line extend parallel to one another in a direction intersecting with the gate lines with an insulating film interposed therebetween. The gate lines and the source lines are formed in a lattice pattern as a whole to define the pixels. Thin-film transistors as switching elements are disposed at intersections of the source lines and the gate lines.

The TFT substrate 120 includes a planar common electrode disposed on the liquid crystal layer 130 side surface of the insulating substrate, an insulating film covering the common electrode, and pixel electrodes disposed on the liquid crystal layer side surface of the insulating film and having slits. Each of the pixel electrodes is disposed in a region surrounded by two adjacent source lines and two adjacent gate lines, and is electrically connected to the corresponding source line through a semiconductor layer included in the corresponding thin-film transistor. That is, the display panel 10 of the present embodiment is a liquid crystal display panel in a fringe field switching (FFS) mode. The positions of the common electrode and the pixel electrodes may be replaced. In this case, a common electrode having a slit is disposed on planar pixel electrodes occupying the respective pixel regions with an insulating film interposed therebetween.

In the present embodiment, the display panel 10 in a horizontal alignment mode in which the pixel electrodes and the common electrode are disposed in one substrate is described, but the display mode of the display panel 10 is not limited to this embodiment and may be a vertical alignment mode in which the pixel electrodes are disposed in the TFT substrate 120 and the common electrode is disposed in the CF substrate 110. The horizontal alignment mode refers to a mode in which liquid crystal molecules are aligned in a direction substantially horizontal to the principal surface of each of a pair of substrates during no voltage application to the liquid crystal layer, and includes, for example, an in-plane switching (IPS) mode as well as the FFS mode described above. The vertical alignment mode refers to a mode in which liquid crystal molecules are aligned in a direction substantially vertical to the principal surface of each of a pair of substrates during no voltage application to the liquid crystal layer, and includes, for example, a vertical alignment (VA) mode and a twisted nematic (TN) mode.

An alignment film having the function of controlling alignment of liquid crystal molecules included in the liquid crystal layer 130 is disposed between the TFT substrate 120 and the liquid crystal layer 130 and between the CF substrate 110 and the liquid crystal layer 130, and in the no-voltage application state where no voltage is applied between the pixel electrodes and the common electrode, liquid crystal molecules included in the liquid crystal layer 130 are aligned substantially horizontally to the principal surface of each of the pair of substrates.

The display panel 10 further includes a source driver electrically connected to the source lines, a gate driver electrically connected to the gate lines, and a controller. The gate driver sequentially supplies scanning signals to the gate lines based on control by the controller. The source driver supplies data signals to the source lines based on control by the controller when the TFTs change to the voltage application state based on the scanning signals. Each of the pixel electrodes is set at a potential in accordance with the data signal supplied through the corresponding TFT, and a fringe field occurs between the pixel electrodes and the common electrode so that liquid crystal molecules in the liquid crystal layer thereby rotates. In this manner, the magnitude of voltage applied between the pixel electrodes and the common electrode is controlled such that retardation of the liquid crystal layer is changed and transmission and non-transmission of light is controlled.

As the CF substrate 110, a substrate generally employed in the field of liquid crystal panels can be used, and members such as color filters and a black matrix (BM) may be disposed on a surface of a transparent substrate such as a glass substrate, for example. More specifically, the CF substrate 110 includes, on the insulating substrate, a black matrix disposed in a lattice pattern corresponding to the gate lines and the source lines, color filters of colors periodically arranged between grids of the black matrix and including a red layer, a green layer, and a blue layer, and an overcoat layer made of a transparent insulating resin and covering the black matrix and the color filters, and a columnar photo spacer disposed on the overcoat layer.

As illustrated in FIGS. 2 to 6, the backlight 40 includes a light source 41 and a reflective sheet 42. The backlight 40 used in the present embodiment is not particularly limited as long as the backlight 40 applies light to the liquid crystal panel 20, and may be a direct-lit backlight or an edge-lit backlight. As a light source of the backlight 40, a typical backlight light source, for example, a light source such as a cold-cathode tube (CCFL) or a light emitting diode (LED), can be used.

In the example of the edge-lit backlight, as illustrated in FIG. 6, the backlight includes the light source 41, the reflective sheet 42, and a light guide plate 43. The light source 41 is disposed at an end surface of the light guide plate 43, and the reflective sheet 42 is disposed at the back surface of the light guide plate 43. As the light guide plate 43, a light guide plate generally employed in the field of liquid crystal display devices can be used. Examples of the reflective sheet 42 include an aluminium sheet, a white polyethylene terephthalate (PET) film, and a reflective film (e.g., available from 3M Company, enhanced specular reflector (ESR) film).

In addition to the members described above, the liquid crystal display device 1 of the present embodiment includes members such as: external circuits such as a tape carrier package (TCP) and a printed circuit board (PCB); optical films such as a viewing angle enlarging film and a luminance enhancing film; and a bezel (frame). Some of these members may be incorporated in other members. Members other than the members described above are not particularly limited, and members generally employed in the field of liquid crystal display devices can be used. Thus, description thereof will be omitted.

Embodiment 2

The features unique to the present embodiment are mainly described here, and description of the matters already described in Embodiment 1 is omitted. The present embodiment is substantially the same as Embodiment 1 except that arrangement of the second light-shielding portions 20L2 is different and the insulating layer 222 is not provided.

Figure 16:
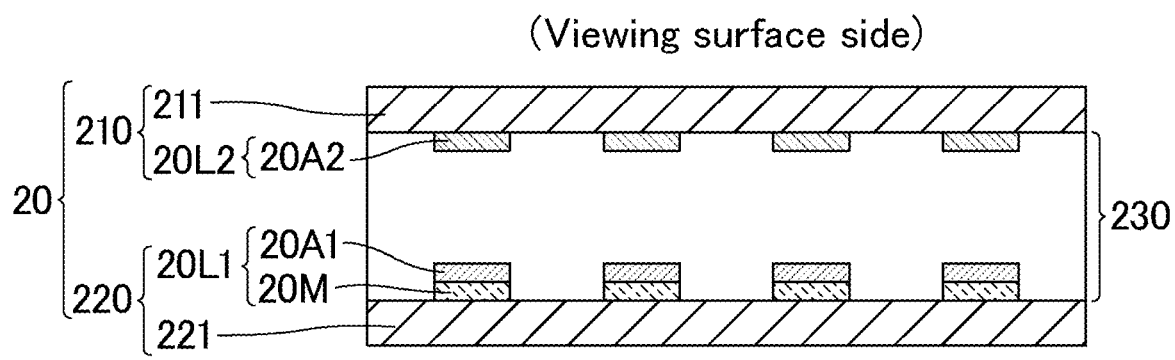
FIG. 16 is a schematic cross-sectional view of a liquid crystal panel of Embodiment 2.

FIG. 16 is a schematic cross-sectional view of a liquid crystal panel of Embodiment 2. In Embodiment 1, the second light-shielding portions 20L2 are disposed in the second substrate 220, whereas in the present embodiment, the first substrate 210 includes the second light-shielding portions 20L2 as illustrated in FIG. 16. With this structure, first light-shielding portions 20L1 and the second light-shielding portions 20L2 also serve as a louver layer 20L that transmits front light 1LA and blocks oblique light 1LB. Since the liquid crystal panel 20 includes PDLC 230, it is possible to switch the mode between the scattering state in which light incident on the liquid crystal panel 20 is scattered and the transmissive state in which light incident on a liquid crystal panel 20 is transmitted by adjusting voltage applied to the PDLC 230.

In the present embodiment, since the liquid crystal panel 20 also includes the louver layer 20L in addition to the PDLC 230, the viewing angle can be controlled by the liquid crystal panel 20, that is, a single member. Thus, the liquid crystal panel 20 of the present embodiment can control the viewing angle with a reduced thickness, as compared to the comparative example.

In the present embodiment, the second light-shielding portions 20L2 are disposed on the viewing surface side of the first light-shielding portions 20L1 with the PDLC 230 interposed therebetween. As described above, the light-shielding portions are made of, for example, a blackened metal, but the thickness of a metal that can be formed in a normal process is about 0.5 μm, and it is difficult to form a thickness (several micrometers to several tens of micrometers) necessary for the louver function. However, as described in the present embodiment, the structure in which the louver layer 20L includes two or more layers of light-shielding portions with the PDLC 230 interposed therebetween can achieve a louver function within the range of a normal process. Since the liquid crystal panel 20 of the present embodiment includes no insulating layer 222, a fabrication process can be shortened, as compared to the liquid crystal panel 20 of Embodiment 1 described above.

Embodiment 3

The features unique to the present embodiment are mainly described here, and description of the matters already described in Embodiment 1 is omitted. The present embodiment is substantially the same as Embodiment 1 except that the louver layer 20L includes additional light-shielding portions as well as the first light-shielding portions 20L1 and the second light-shielding portions 20L2.

Figure 17:
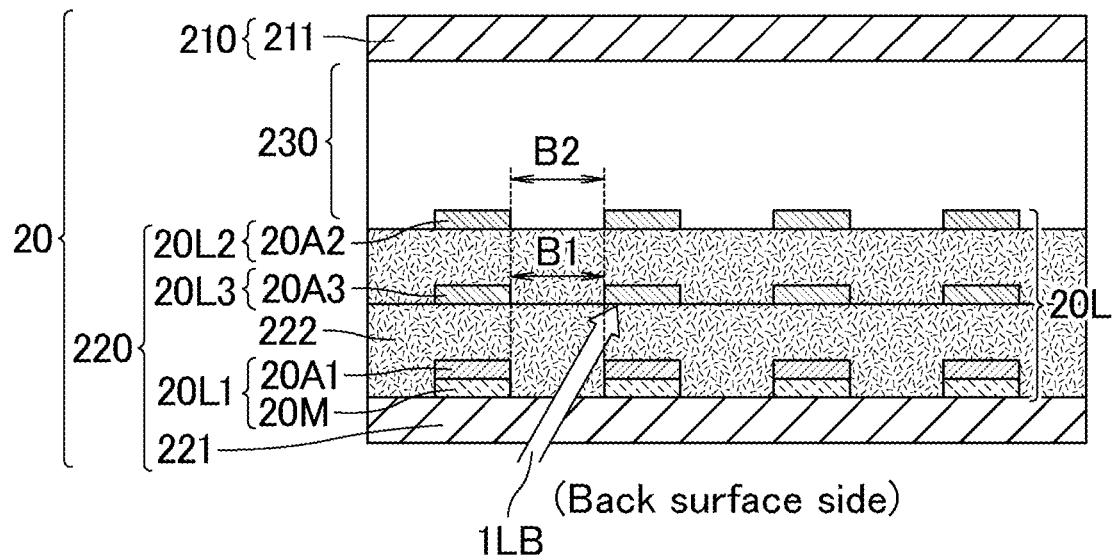
FIG. 17 is a schematic cross-sectional view showing light incident on a liquid crystal panel of Embodiment 3.

FIG. 17 is a schematic cross-sectional view showing light incident on a liquid crystal panel of Embodiment 3. As illustrated in FIG. 17, a liquid crystal panel 20 of the present embodiment includes: first light-shielding portions 20L1 extending parallel to one another; second light-shielding portions 20L2 extending parallel to one another in the same direction as the first light-shielding portions 20L1 and located closer to the viewing surface side than the first light-shielding portions 20L1 are; and third light-shielding portions 20L3 extending parallel to one another in the same direction as the first light-shielding portions 20L1, located closer to the viewing surface side than the first light-shielding portions 20L1 are, and located closer to the back surface side than the second light-shielding portions 20L2 are. With this structure, the first light-shielding portions 20L1, the second light-shielding portions 20L2, and the third light-shielding portions 20L3 also serve as a louver layer 20L that transmits front light 1LA and blocks oblique light 1LB. A layer in which the third light-shielding portions 20L3 are provided is also referred to as a third light-shielding layer. Since the liquid crystal panel 20 includes PDLC 230, it is possible to switch the mode between the scattering state in which light incident on the liquid crystal panel 20 is scattered and the transmissive state in which light incident on the liquid crystal panel 20 is transmitted by adjusting voltage applied to the PDLC 230.

In the present embodiment, since the liquid crystal panel 20 also includes the louver layer 20L in addition to the PDLC 230, the viewing angle can be controlled by the liquid crystal panel 20, that is, a single member. Thus, the liquid crystal panel 20 of the present embodiment can control the viewing angle with a reduced thickness, as compared to the comparative example.

Figure 18:
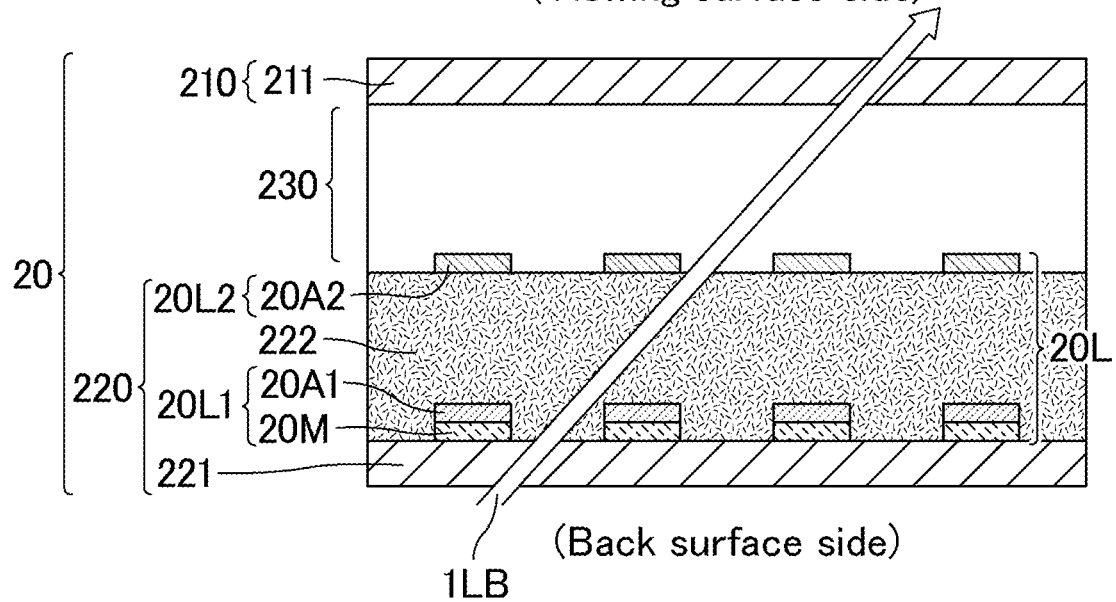
FIG. 18 is a schematic cross-sectional view showing light incident on the liquid crystal panel of Embodiment 1.

FIG. 18 is a schematic cross-sectional view showing light incident on the liquid crystal panel of Embodiment 1. As illustrated in FIG. 17, the louver layer 20L of the present embodiment has a three-layer structure including the first light-shielding portions 20L1, the second light-shielding portions 20L2, and the third light-shielding portions 20L3. On the other hand, as illustrated in FIG. 18, the louver layer 20L of Embodiment 1 has the double-layer structure including the first light-shielding portions 20L1 and the second light-shielding portions 20L2. Supposing light passing from a first slit between the first light-shielding portions 20L1 to a second slit immediately above the first slit is primary light, light passing to a third slit next to the second slit is secondary light, and light passing to a fourth slit adjacent to the third slit is tertiary light in the light from the back surface side (specifically light from the backlight 40), as illustrated in FIG. 18, secondary and higher-order light that cannot be blocked by the double-layer structure as used in Embodiment 1 can be cut as illustrated in FIG. 17 by providing the louver layer 20L with the three-layer structure as in the present embodiment. As a result, light with a narrow directional angle can be emitted from the louver layer 20L.

The third light-shielding portions 20L3 are similar to the second light-shielding portions 20L2. Each of the third light-shielding portions 20L3 preferably includes a third light-absorbing layer 20A3. The third light-absorbing layer 20A3 is similar to the first light-absorbing layer 20A1 and the second light-absorbing layer 20A2.

Each of the third light-shielding portions 20L3 may include a reflective surface at the surface on the back surface side (specifically the backlight 40 side). With this structure, light from the back surface side (specifically light from the backlight 40) can be reflected by the reflective surface toward the back surface side. In addition, in a case where the backlight 40 includes the reflective sheet 42, reflected light from the reflective surface can be reflected toward the viewing surface side again by the reflective sheet 42, so that light from the backlight 40 can be recycled. As a result, decrease in luminance can be suppressed.

Each of the third light-shielding portions 20L3 may include the third light-absorbing layer 20A3, and the reflective surface overlapping the third light-absorbing layer 20A3 and located at the surface on the back surface side (specifically the backlight 40 side) of the third light-absorbing layer 20A3. With this structure, light from the back surface side to be absorbed in the third light-absorbing layer 20A3 (specifically light from the backlight 40) can be reflected by the reflective surface toward the back surface side. In addition, in a case where the backlight 40 includes the reflective sheet 42, reflected light from the reflective surface can be reflected toward the viewing surface side again by the reflective sheet 42, so that light from the backlight 40 can be recycled. As a result, decrease in luminance can be suppressed.

The slit width 20Lsw of the third light-shielding portions 20L3 may be equal to or different from the slit width 20Lsw of the first light-shielding portions 20L1. The slit width 20Lsw of the third light-shielding portions 20L3 may be equal to or different from the slit width 20Lsw of the second light-shielding portions 20L2. The present embodiment is directed to the case where the slit width 20Lsw of the third light-shielding portions 20L3 is equal to the slit width 20Lsw of the first light-shielding portions 20L1 and the second light-shielding portions 20L2.

The light-shielding width 20Lw of the third light-shielding portions 20L3 may be equal to or different from the light-shielding width 20Lw of the first light-shielding portions 20L1. The light-shielding width 20Lw of the third light-shielding portions 20L3 may be equal to or different from the light-shielding width 20Lw of the second light-shielding portions 20L2. The present embodiment is directed to the case where the light-shielding width 20Lw of the third light-shielding portions 20L3 is equal to the light-shielding width 20Lw of the first light-shielding portions 20L1 and the second light-shielding portions 20L2.

The slit pitch 20Lp of the third light-shielding portions 20L3 may be equal to or different from the slit pitch 20Lp of the first light-shielding portions 20L1. The slit pitch 20Lp of the third light-shielding portions 20L3 may be equal to or different from the slit pitch 20Lp of the second light-shielding portions 20L2. The present embodiment is directed to the case where the slit pitch 20Lp of the third light-shielding portions 20L3 is equal to the slit pitch 20Lp of the first light-shielding portions 20L1 and the second light-shielding portions 20L2.

In a plan view, preferably, the first light-shielding portions 20L1 and the third light-shielding portions 20L3 are not disposed in first gaps B1, and the second light-shielding portions 20L2 and the third light-shielding portions 20L3 are not disposed in second gaps B2. This structure can cut secondary and higher-order light to thereby reduce an increase in the viewing angle in the narrow viewing angle mode.

Each of the first gaps B1 is preferably 1 μm or more and 10 μm or less. Each of the second gaps B2 is preferably 1 μm or more and 10 μm or less.

Modified Example 1 of Embodiment 3

In Embodiment 3, the louver layer 20L has the three-layer structure. Alternatively, the louver layer 20L may include a four-layer structure including fourth light-shielding portions 20L4 extending parallel to one another in the same direction as the first light-shielding portions 20L1, located closer to the viewing surface side than the first light-shielding portions 20L1 are, and located closer to the back surface side than the third light-shielding portions 20L3 are, in addition to the first light-shielding portions 20L1, the second light-shielding portions 20L2, and the third light-shielding portions 20L3. This structure enables effective cut of secondary light to thereby enhance privacy protection. A layer in which the fourth light-shielding portions 20L4 are provided is also referred to as a fourth light-shielding layer.

The fourth light-shielding portions 20L4 are similar to the second light-shielding portions 20L2. Each of the fourth light-shielding portions 20L4 preferably includes the fourth light-absorbing layer 20A4. The fourth light-absorbing layer 20A4 is similar to the first light-absorbing layer 20A1, the second light-absorbing layer 20A2, and the third light-absorbing layer 20A3.

Each of the fourth light-shielding portions 20L4 may include a reflective surface at the surface on the back surface side (specifically the backlight 40 side). With this structure, light from the back surface side (specifically light from the backlight 40) can be reflected by the reflective surface toward the back surface side. In addition, in a case where the backlight 40 includes the reflective sheet 42, reflected light from the reflective surface can be reflected toward the viewing surface side again by the reflective sheet 42, so that light from the backlight 40 can be recycled. As a result, decrease in luminance can be suppressed.

Each of the fourth light-shielding portions 20L4 may include the fourth light-absorbing layer 20A4 and the reflective surface overlapping the fourth light-absorbing layer 20A4 and located at the surface on the back surface side (specifically the backlight 40 side) of the fourth light-absorbing layer 20A4. With this structure, light from the back surface side to be absorbed in the fourth light-absorbing layer 20A4 (specifically light from the backlight 40) can be reflected by the reflective surface toward the back surface side. In addition, in a case where the backlight 40 includes the reflective sheet 42, reflected light from the reflective surface can be reflected toward the viewing surface side again by the reflective sheet 42, so that light from the backlight 40 can be recycled. As a result, decrease in luminance can be suppressed.

A slit width 20Lsw of the fourth light-shielding portions 20L4 may be equal to or different from the slit width 20Lsw of the first light-shielding portions 20L1. The slit width 20Lsw of the fourth light-shielding portions 20L4 may be equal to or different from the slit width 20Lsw of the second light-shielding portions 20L2. The slit width 20Lsw of the fourth light-shielding portions 20L4 may be equal to or different from the slit width 20Lsw of the third light-shielding portions 20L3. The present embodiment is directed to the case where the slit width 20Lsw of the fourth light-shielding portions 20L4 is equal to the slit width 20Lsw of the first light-shielding portions 20L1, the second light-shielding portions 20L2, and the third light-shielding portions 20L3.

The light-shielding width 20Lw of the fourth light-shielding portions 20L4 may be equal to or different from the light-shielding width 20Lw of the first light-shielding portions 20L1. A light-shielding width 20Lw of the fourth light-shielding portions 20L4 may be equal to or different from the light-shielding width 20Lw of the second light-shielding portions 20L2. The light-shielding width 20Lw of the fourth light-shielding portions 20L4 may be equal to or different from the light-shielding width 20Lw of the third light-shielding portions 20L3. The present embodiment is directed to the case where the light-shielding width 20Lw of the fourth light-shielding portions 20L4 is equal to the light-shielding width 20Lw of the first light-shielding portions 20L1, the second light-shielding portions 20L2, and the third light-shielding portions 20L3.

The slit pitch 20Lp of the fourth light-shielding portions 20L4 may be equal to or different from the slit pitch 20Lp of the first light-shielding portions 20L1. The slit pitch 20Lp of the fourth light-shielding portions 20L4 may be equal to or different from the slit pitch 20Lp of the second light-shielding portions 20L2. The slit pitch 20Lp of the fourth light-shielding portions 20L4 may be equal to or different from the slit pitch 20Lp of the third light-shielding portions 20L3. The present embodiment is directed to the case where the slit pitch 20Lp of the fourth light-shielding portions 20L4 is equal to the slit pitch 20Lp of the first light-shielding portions 20L1, the second light-shielding portions 20L2, and the third light-shielding portions 20L3.

In a plan view, the fourth light-shielding portions 20L4 are preferably located at the same position as the first light-shielding portions 20L1. This structure enables more effective cut of secondary light to thereby further enhance privacy protection. Similarly, in a plan view, the fourth light-shielding portions 20L4 are preferably located at the same position as the second light-shielding portions 20L2. This structure enables more effective cut of secondary light to thereby further enhance privacy protection.

Modified Example 2 of Embodiment 3

In the structure described in Embodiment 3, the first light-shielding portions 20L1 are located at the same position as the second light-shielding portions 20L2 in a plan view. Alternatively, the first light-shielding portions 20L1 may not be located at the same position as the second light-shielding portions 20L2.

Figure 19:
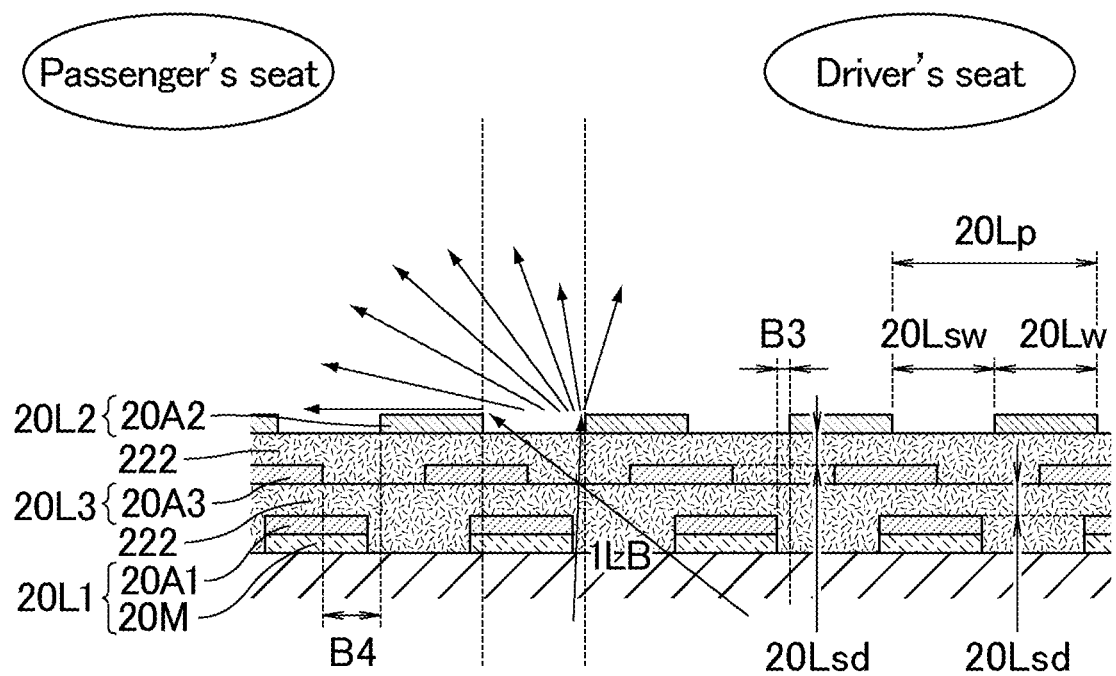
FIG. 19 is a schematic cross-sectional view of a liquid crystal panel of Modified Example 2 of Embodiment 3.

FIG. 19 is a schematic cross-sectional view of a liquid crystal panel of Modified Example 2 of Embodiment 3. As illustrated in FIG. 19, a liquid crystal panel 20 of the present modified example is an onboard liquid crystal panel disposed at a vehicle front side in front of a driver's seat and a passenger's seat, and includes, in a plan view, third gaps B3 in which first light-shielding portions 20L1 and second light-shielding portions 20L2 are not disposed, and fourth gaps B4 in which third light-shielding portions 20L3 and second light-shielding portions 20L2 are not disposed. Each of the third gaps B3 is adjacent to the driver's seat side of one of the first light-shielding portions 20L1. Each of the fourth gaps B4 is adjacent to the driver's seat side of one of the third light-shielding portions 20L3. With this structure, a narrow viewing angle can be achieved only at the driver's seat, and luminance can be enhanced at the passenger's seat in a privacy mode. Each of the third gaps B3 is, for example, 0.4 µm or more and 0.6 µm or less. Each of the fourth gaps B4 is, for example, 2.0 µm or more and 2.5 µm or less.

Embodiment 4

The features unique to the present embodiment are mainly described here, and description of the matters already described in Embodiment 1 is omitted. The present embodiment is substantially the same as Embodiment 1 except for a difference in the shape of the second light-shielding portions 20L2.

Figure 20:
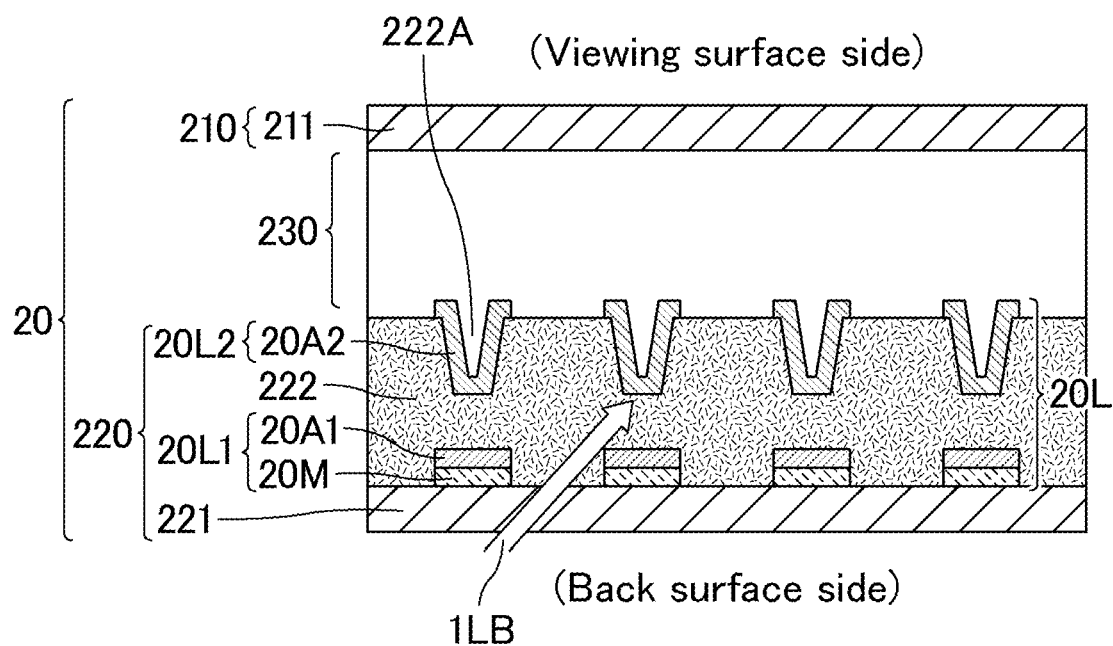
FIG. 20 is a schematic cross-sectional view showing light incident on a liquid crystal panel of Embodiment 4.

FIG. 20 is a schematic cross-sectional view showing light incident on a liquid crystal panel of Embodiment 4. As illustrated in FIG. 20, a liquid crystal panel 20 of the present embodiment includes first light-shielding portions 20L1 extending parallel to one another, and second light-shielding portions 20L2 extending parallel to one another in the same direction as the first light-shielding portions 20L1 and located closer to the viewing surface side than the first light-shielding portions 20L1 are. With this structure, the first light-shielding portions 20L1 and the second light-shielding portions 20L2 serve as the louver layer 20L that transmits front light 1LA and blocks oblique light 1LB. Since the liquid crystal panel 20 includes PDLC 230, it is possible to switch the mode between the scattering state in which light incident on the liquid crystal panel 20 is scattered and the transmissive state in which light incident on the liquid crystal panel 20 is transmitted by adjusting voltage applied to the PDLC 230.

In the present embodiment, since the liquid crystal panel 20 includes the louver layer 20L in addition to the PDLC 230, the viewing angle can be controlled by the liquid crystal panel 20, that is, a single member. Thus, the liquid crystal panel 20 of the present embodiment can control the viewing angle with a reduced thickness, as compared to the comparative example.

In the present embodiment, the insulating layer 222 includes holes 222A in the surface on the viewing surface side. Each of the second light-shielding portions 20L2 covers a corresponding hole 222A. With this structure, advantages similar to those in the case where the louver layer 20L has the three-layer structure as described in Embodiment 3 can be obtained. It is sufficient for the holes 222A to have recessed portions, and the holes 222A may not be through holes. In Embodiments 1 to 3, the second light-shielding portions 20L2 are arranged in plane, but the second light-shielding portions 20L2 of the present embodiment are arranged to cover the holes 222A in the insulating layer 222.

Embodiment 5

The features unique to the present embodiment are mainly described here, and description of the matters already described in Embodiment 1 is omitted. The present embodiment is similar to Embodiment 1 except for difference in arrangement of the display panel 10 and the liquid crystal panel 20.

Figure 21:
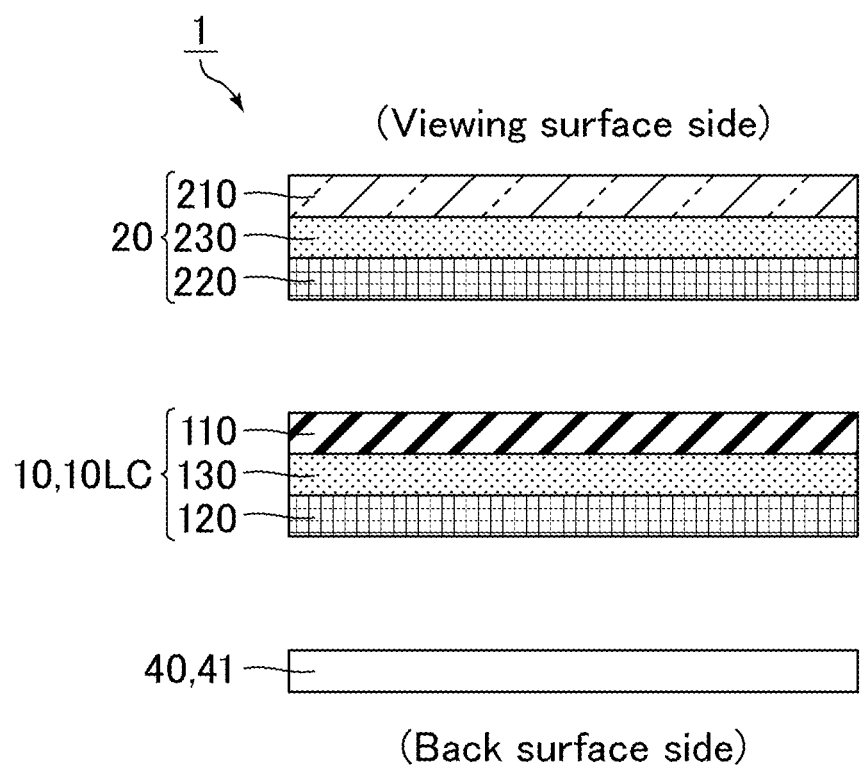
FIG. 21 is a schematic cross-sectional view of a liquid crystal display device of Embodiment 5.

FIG. 21 is a schematic cross-sectional view of a liquid crystal display device of Embodiment 5. As illustrated in FIG. 21, a liquid crystal display device 1 of the present embodiment includes, sequentially from the viewing surface side toward the back surface side, a liquid crystal panel 20, a liquid crystal display panel 10LC as a display panel 10, and a backlight 40. With this structure, first light-shielding portions 20L1 and second light-shielding portions 20L2 also serve as a louver layer 20L that transmits front light 1LA and blocks oblique light 1LB. Since the liquid crystal panel 20 includes PDLC 230, it is possible to switch the mode between the scattering state in which light incident on the liquid crystal panel 20 is scattered and the transmissive state in which light incident on the liquid crystal panel 20 is transmitted by adjusting voltage applied to the PDLC 230.

In the present embodiment, since the liquid crystal panel 20 also includes the louver layer 20L in addition to the PDLC 230, the viewing angle can be controlled by the liquid crystal panel 20, that is, a single member. Thus, the liquid crystal panel 20 of the present embodiment can control the viewing angle with a reduced thickness, as compared to the comparative example.

Light from the backlight 40 enters the liquid crystal panel 20 after passing through the liquid crystal display panel 10LC, and in a wide viewing angle mode, light from a low polar angle to a high polar angle is emitted from the liquid crystal panel 20, whereas in a narrow viewing angle mode, only light at the low polar angle side is emitted from the liquid crystal panel 20. In this manner, arrangement of the display panel 10 with respect to the liquid crystal panel 20 is not limited, and can be arranged as appropriate.

Embodiment 6

The features unique to the present embodiment are mainly described here, and description of the matters already described in Embodiment 1 is omitted. The present embodiment is similar to Embodiment 1 except for the structure of the display panel 10 and the absence of the backlight.

Figure 22:
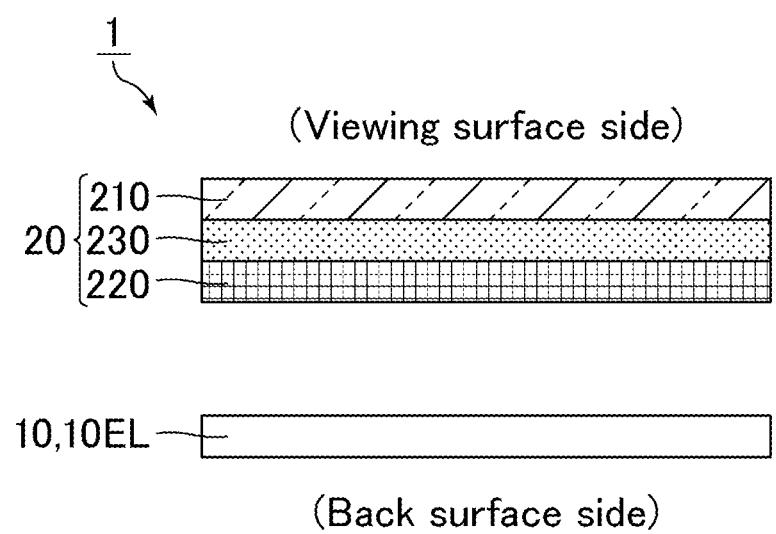
FIG. 22 is a schematic cross-sectional view of a liquid crystal display device of Embodiment 6.

FIG. 22 is a schematic cross-sectional view of a liquid crystal display device of Embodiment 6. As illustrated in FIG. 22, a display panel 10 is an organic electroluminescence display panel 10EL and includes, sequentially from the viewing surface side toward the back surface side, a liquid crystal panel 20 and an organic electroluminescence display panel 10EL. With this structure, first light-shielding portions 20L1 and second light-shielding portions 20L2 also serve as a louver layer 20L that transmits front light 1LA and blocks oblique light 1LB. Since the liquid crystal panel 20 includes PDLC 230, it is possible to switch the mode between the scattering state in which light incident on the liquid crystal panel 20 is scattered and the transmissive state in which light incident on the liquid crystal panel 20 is transmitted by adjusting voltage applied to the PDLC 230.

In the present embodiment, since the liquid crystal panel 20 includes the louver layer 20L in addition to the PDLC 230, the viewing angle can be controlled by the liquid crystal panel 20, that is, a single member. Thus, the liquid crystal panel 20 of the present embodiment can control the viewing angle with a reduced thickness, as compared to the comparative example.

This structure enables display of an image without a backlight. As a result, in the present embodiment, thickness, weight, and manufacturing costs can be reduced, as compared to the comparative example.

EXAMPLES

Hereinafter, the present invention will be described in more detail by way of examples, but the present invention is not limited only to these examples.

Example 1

Figure 23A:
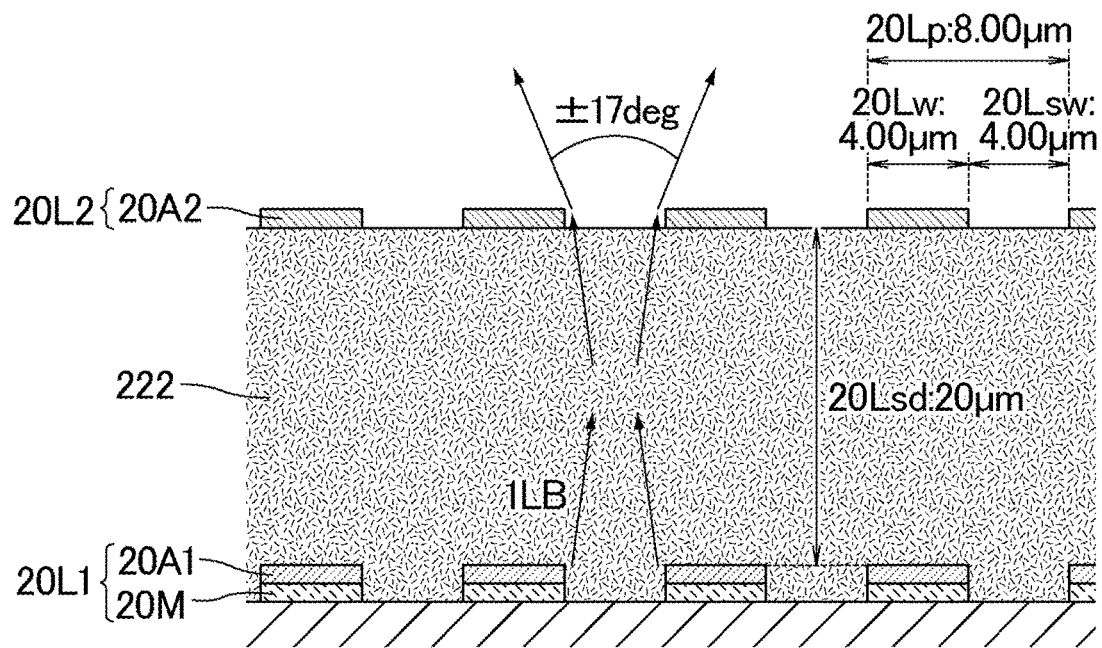
FIG. 23A is a schematic cross-sectional view of a louver layer included in a liquid crystal display device of Example 1.
Figure 23B:
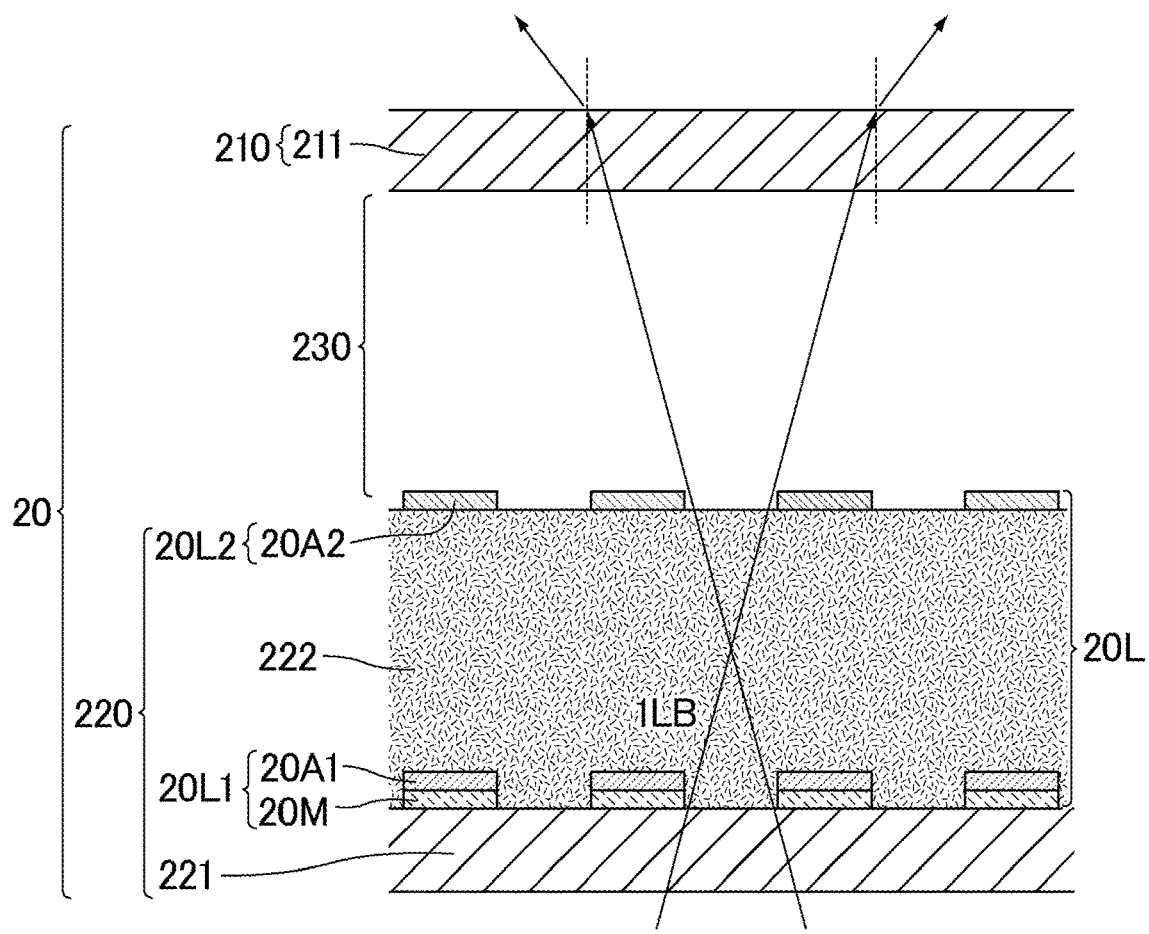
FIG. 23B is a schematic cross-sectional view showing light emitted from a backlight of the liquid crystal display device of Example 1.

FIG. 23A is a schematic cross-sectional view of a louver layer included in a liquid crystal display device of Example 1. FIG. 23B is a schematic cross-sectional view showing light emitted from a backlight of the liquid crystal display device of Example 1. The liquid crystal display device of Example 1 corresponds to the liquid crystal display device 1 of Embodiment 1 including the louver layer 20L with the double-layer structure. A viewing angle of the liquid crystal display device of Example 1 in a narrow viewing angle mode was calculated by simulation. The simulation was conducted by geometric calculation described below. The viewing angle in the example means a polar angle. The size of the display panel 10 was 12.4 inches, resolution was FHD, the width of the pixels 10P in the extension direction of the gate lines 10G (pixel pitch 10PI) was 48 µm, and the width of the pixels 10P in the extension direction of the source lines 10S was 144 µm.

As illustrated in FIG. 23A, the louver layer 20L had a double-layer structure including the first light-shielding portions 20L1 (first light-shielding layer) and the second light-shielding portions 20L2 (second light-shielding layer). The first light-shielding portions 20L1 and the second light-shielding portions 20L2 had a slit width 20Lsw of 4.00 µm, a light-shielding width 20Lw of 4.00 µm, and a slit pitch 20Lp of 8.00 µm. In a plan view, the first light-shielding portions 20L1 were arranged at the same position as the second light-shielding portions 20L2.

The insulating layer 222 was an organic insulating film. The inter-slit distance 20Lsd between the first light-shielding portions 20L1 and the second light-shielding portions 20L2, that is, the thickness of the insulating layer 222 disposed between the first light-shielding portions 20L1 and the second light-shielding portions 20L2, was 20 µm.

Figure 24:
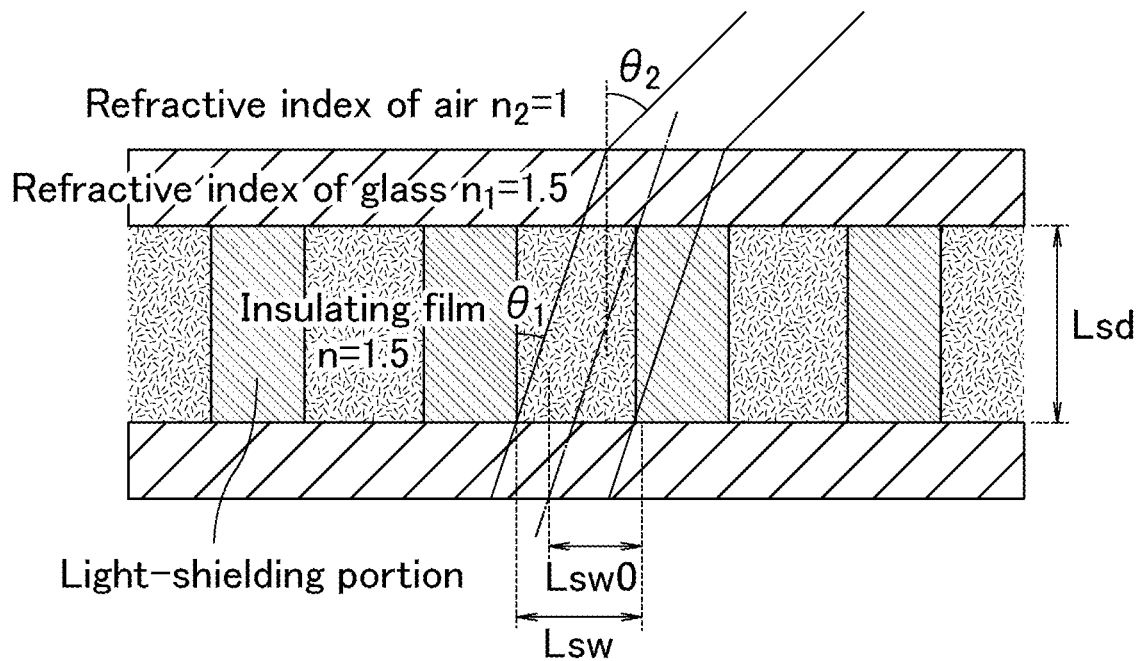
FIG. 24 is a view showing geometric calculation used in simulation of a viewing angle.

FIG. 24 is a view showing geometric calculation used in simulation of a viewing angle. As illustrated in FIG. 24, supposing the slit width in the liquid crystal panel 20 is Lsw, the inter-slit distance is Lsd, transmittance of light incident on a transmissive region having the slit width Lsw at an incident angle $\theta_1$ is T, and the width of light shielded by the light-shielding portions in the slit width Lsw is Lsw0. The transmittance of light at the width Lsw0 is 0%. The transmittance when light passes through the slit width Lsw at an angle $\theta_1$ of 0° is 100%. At this time, the width Lsw0 is expressed by formula (A1):

$$Lsw0 = Lsd \times \tan \theta_1 \qquad \text{formula (A1)}$$

The transmittance T is expressed by formula (A2):

$$\text{transmittance } T = (Lsw - Lsw0)/Lsw$$

$$= (Lsw - Lsd \times \tan \theta_1)/Lsw \qquad \text{formula (A2)}$$

Supposing the refractive index of glass is $n_1$, a refractive index of air is $n_2$, and the angle of light refracted at the interface between glass and air and emitted is $\theta_2$, $\theta_2$ is expressed by formula (A3) by Snell's law.

$$\theta_2 = \sin^{-1}(n_1/n_2 \times \sin \theta_1) \qquad \text{formula (A3)}$$

In the present example, formula (A2) and formula (A3) were calculated in the range of $-80° \leq \theta_1 \leq 80°$, and simulation results are shown with the transmittance T denoted by the ordinate, and $\theta_2$ denoted by the abscissa. For example, the transmittance in FIG. 26 described later, for example, corresponds to the transmittance T, and a polar angle in FIG. 26 corresponds to $\theta_2$.

Simulation results show that the liquid crystal display device of Example 1 can achieve a narrow viewing angle with a polar angle of ±17°, as illustrated in FIG. 23A. Although refraction actually occurs at the glass/air interface as illustrated in FIG. 23B, for simplicity of drawings, FIG. 23A does not show the PDLC 230 and the glass substrates as the first support substrate 211 and the second support substrate 221, and shows values in consideration of refraction at the glass/air interface, and oblique light 1LB. Hereinafter, angles in the drawings show angles in consideration of refraction at the glass/air interface.

Example 2

Figure 25:
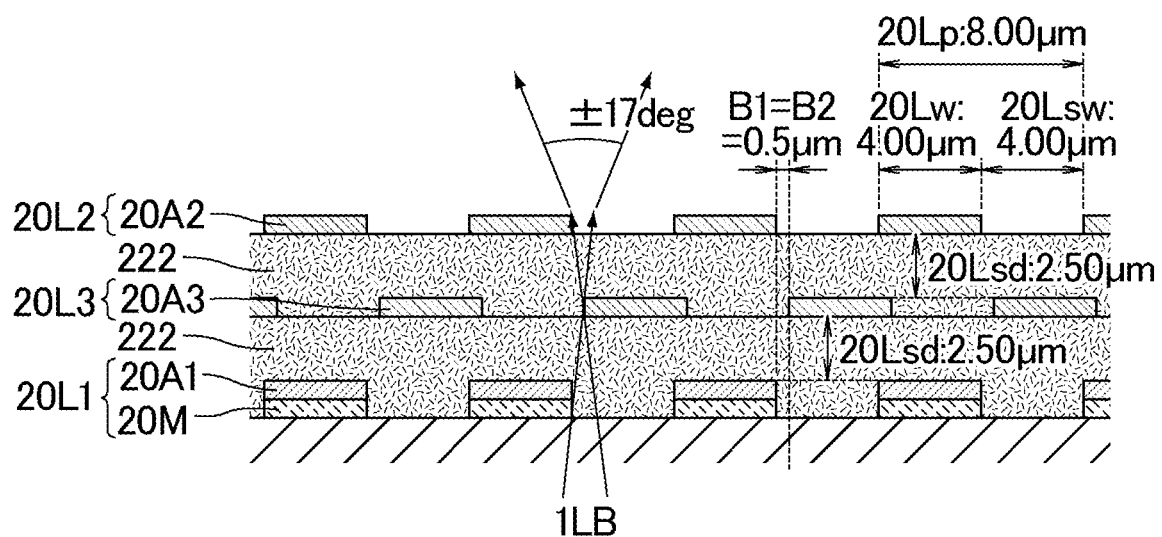
FIG. 25 is a schematic cross-sectional view of a louver layer included in a liquid crystal display device of Example 2.
Figure 26:
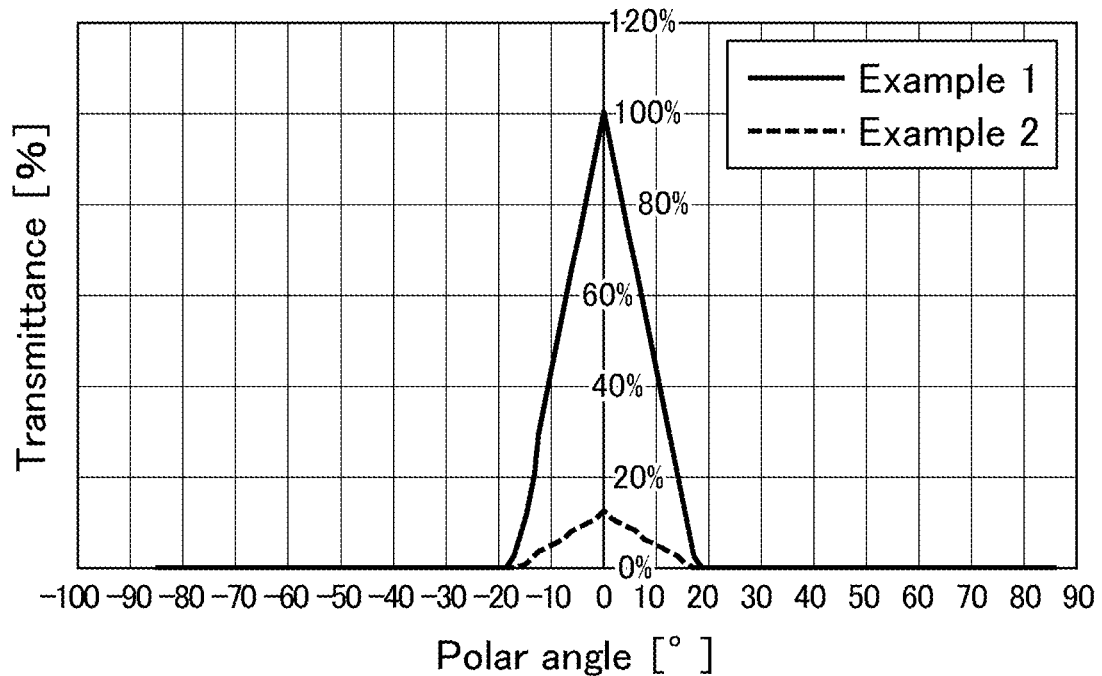
FIG. 26 shows simulation results demonstrating transmittance relative to polar angles in the liquid crystal display devices of Examples 1 and 2.

FIG. 25 is a schematic cross-sectional view of a louver layer included in a liquid crystal display device of Example 2. FIG. 26 shows simulation results demonstrating a transmittance relative to polar angles in the liquid crystal display devices of Examples 1 and 2. The liquid crystal display device of Example 2 corresponds to the liquid crystal display device of Embodiment 3 including the louver layer 20L with the three-layer structure. A viewing angle of the liquid crystal display device of Example 2 in a narrow viewing angle mode was calculated by simulation. The size of the display panel 10 was 12.4 inches, the resolution was FHD, the width of the pixels 10P in the extension direction of the gate lines 10G (pixel pitch 10PI) was 48 µm, and the width of the pixels 10P in the extension direction of the source lines 10S was 144 µm.

As illustrated in FIG. 25, the louver layer 20L had a three-layer structure including the first light-shielding portions 20L1 (first light-shielding layer), the second light-shielding portions 20L2 (second light-shielding layer), and the third light-shielding portions 20L3 (third light-shielding layer). The first light-shielding portions 20L1, the second light-shielding portions 20L2, and the third light-shielding portions 20L3 had a slit width 20Lsw of 4.00 µm, a light-shielding width 20Lw of 4.00 µm, and a slit pitch 20Lp of 8.00 µm. In a plan view, the first light-shielding portions 20L1 are arranged at the same position as the second light-shielding portions 20L2. In a plan view, a gap (first gap B1) between a first light-shielding portion 20L1 and a third light-shielding portion 20L3 adjacent to each other and a gap (second gap B2) between a second light-shielding portion 20L2 and a third light-shielding portion 20L3 adjacent to each other was 0.5 µm.

The insulating layer 222 was an organic insulating film. The inter-slit distance 20Lsd between the first light-shielding portions 20L1 and the third light-shielding portions 20L3, that is, the thickness of the insulating layer 222 disposed between the first light-shielding portions 20L1 and the third light-shielding portions 20L3, was 2.50 µm. The inter-slit distance 20Lsd between the third light-shielding portions 20L3 and the second light-shielding portions 20L2, that is, the thickness of the insulating layer 222 disposed between the third light-shielding portions 20L3 and the second light-shielding portions 20L2, was 2.50 µm.

Simulation results show that the liquid crystal display device of Example 2 can also achieve a narrow viewing angle with a polar angle of ±17° in a manner similar to Example 1 as illustrated in FIG. 25.

To obtain a narrow viewing angle, it is necessary to increase the inter-slit distance 20Lsd or reduce the slit width 20Lsw, but there are restrictions and limitations on processes. For example, from Example 1, to achieve a narrow viewing angle with a polar angle of ±17°, the inter-slit distance 20Lsd needed to be 20 µm in the case of setting the slit width 20Lsw at 4.00 µm. That is, it was found that the thickness of the insulating layer 222 constituted by the organic insulating film needs to be 20 µm.

The thickness of an organic insulating film formed in a normal fabrication process is about 3 µm or less. Thus, in the case of forming an organic insulating film with a large thickness of 20 µm, a heavy burden such as an increased takt time is applied to the fabrication process.

On the other hand, as described in Example 2, the three-layer structure of the louver layer 20L can obtain narrow viewing angle performance within a normal fabrication process. When the louver layer 20L has the three-layer structure including an upper layer (second light-shielding portions 20L2 (second light-shielding layer)), an intermediate layer (third light-shielding portions 20L3 (third light-shielding layer)), and a lower layer (first light-shielding portions 20L1 (first light-shielding layer)), and the position of the intermediate layer is shifted such that a gap between the upper layer and the intermediate layer and a gap between the intermediate layer and the lower layer is, for example, 0.5 µm, the thickness of the insulating layer 222 (specifically organic insulating film) can be set at 2.5 µm, which is within a normal fabrication process, and, a narrow viewing angle with a polar angle of ±17° similar to that of Example 1 can also be obtained in Example 2, as illustrated in FIG. 26. FIG. 26 shows simulation results demonstrating a transmittance to a polar angle in the liquid crystal display devices of Examples 1 and 2. In the simulation of viewing angle characteristics illustrated in FIG. 26, secondary and higher-order light passing to an adjacent slit is not taken into consideration.

Example 3

Figure 27:
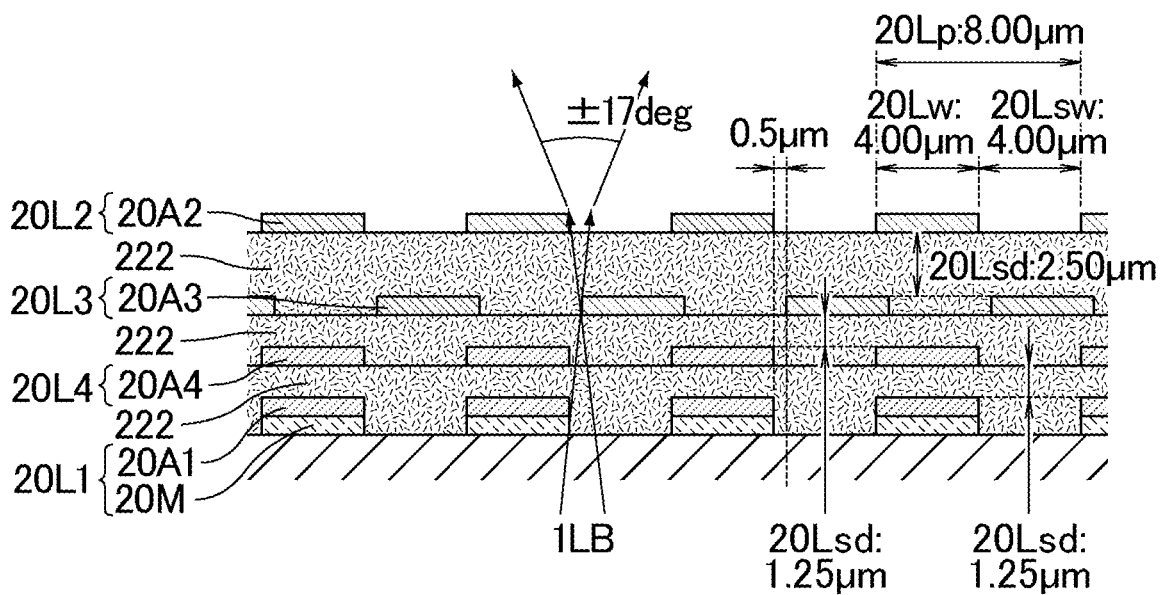
FIG. 27 is a schematic cross-sectional view of a louver layer included in a liquid crystal display device of Example 3.

FIG. 27 is a schematic cross-sectional view of the louver layer included in a liquid crystal display device of Example 3. The liquid crystal display device of Example 3 corresponds to the liquid crystal display device of Modified Example 1 of Embodiment 3 including the louver layer 20L having the four-layer structure. A viewing angle of the liquid crystal display device of Example 3 in a narrow viewing angle mode was calculated by simulation. The size of the display panel 10 was 12.4 inches, the resolution was FHD, the width of the pixels 10P in the extension direction of the gate lines 10G (pixel pitch 10PI) was 48 µm, and the width of the pixels 10P in the extension direction of the source lines 10S was 144 µm.

As illustrated in FIG. 27, the louver layer 20L had a four-layer structure including first light-shielding portions 20L1 (first light-shielding layer), second light-shielding portions 20L2 (second light-shielding layer), third light-shielding portions 20L3 (third light-shielding layer), and fourth light-shielding portions 20L4 (fourth light-shielding layer). The first light-shielding portions 20L1, the second light-shielding portions 20L2, the third light-shielding portions 20L3, and the fourth light-shielding portions 20L4 had a slit width 20Lsw of 4.00 µm, a light-shielding width 20Lw of 4.00 µm, and a slit pitch 20Lp of 8.00 µm. In a plan view, the first light-shielding portions 20L1 are arranged at the same position as the second light-shielding portions 20L2 and the fourth light-shielding portions 20L4. In a plan view, a gap (first gap B1) between a first light-shielding portion 20L1 and a third light-shielding portion 20L3 adjacent to each other, a gap (second gap B2) between a second light-shielding portion 20L2 and a third light-shielding portion 20L3 adjacent to each other, and a gap between a fourth light-shielding portion 20L4 and a third light-shielding portion 20L3 adjacent to each other were each 0.5 µm.

The insulating layer 222 was an organic insulating film. The inter-slit distance 20Lsd between the first light-shielding portions 20L1 and the fourth light-shielding portions 20L4, that is, the thickness of the insulating layer 222 disposed between the first light-shielding portions 20L1 and the fourth light-shielding portions 20L4, was 1.25 µm. The inter-slit distance 20Lsd between the fourth light-shielding portions 20L4 and the third light-shielding portions 20L3, that is, the thickness of the insulating layer 222 disposed between the fourth light-shielding portions 20L4 and the third light-shielding portions 20L3, was 1.25 µm. The inter-slit distance 20Lsd between the third light-shielding portions 20L3 and the second light-shielding portions 20L2, that is, the thickness of the insulating layer 222 disposed between the third light-shielding portions 20L3 and the second light-shielding portions 20L2, was 2.50 µm.

Simulation results show that the liquid crystal display device of Example 3 can also achieve a narrow viewing angle with a polar angle of ±17° in a manner similar to Example 1 as illustrated in FIG. 27.

In Example 2, in light emitted from the backlight 40, light at a polar angle of 71° or more was emitted as secondary light through the louver layer 20L toward the viewing surface side. However, the four-layer structure of the louver layer 20L as described in Example 3 can cut secondary light as illustrated in FIG. 27 to thereby enhance privacy protection.

Example 4

Figure 28:
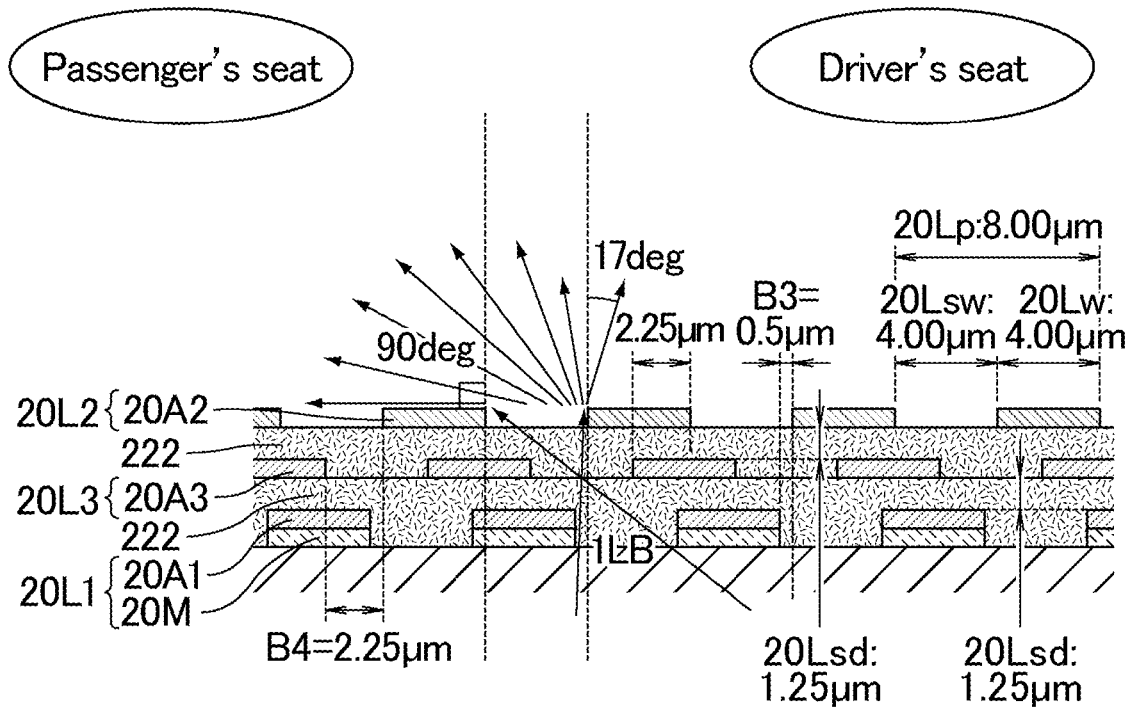
FIG. 28 is a schematic cross-sectional view of a louver layer included in a liquid crystal display device of Example 4.
Figure 29:
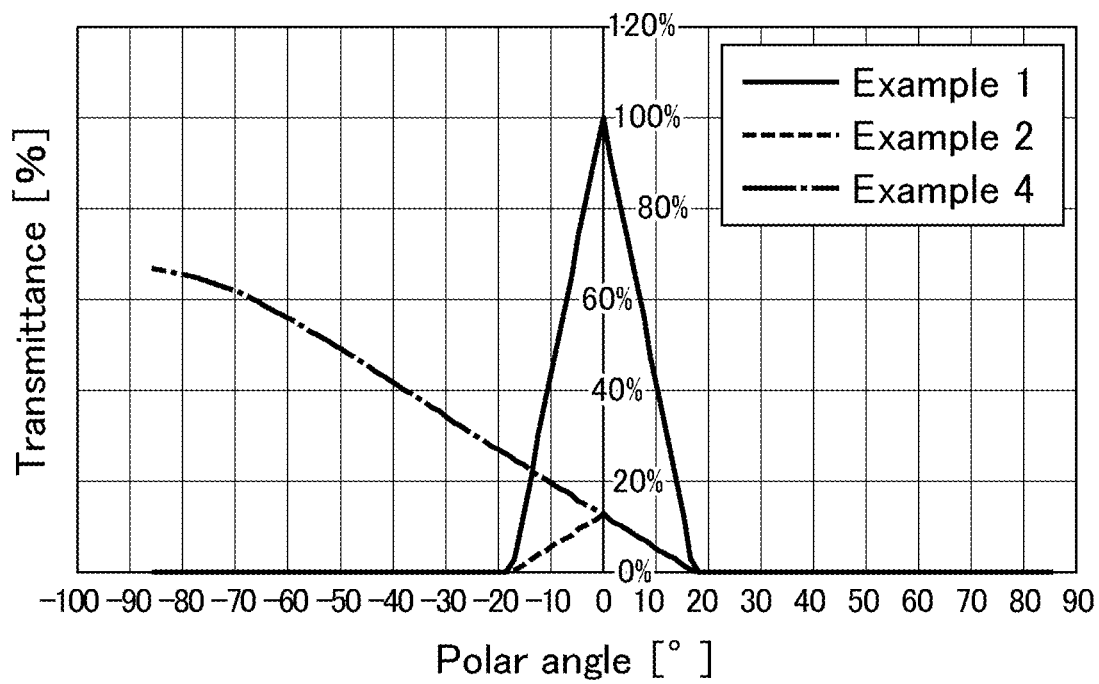
FIG. 29 shows simulation results demonstrating transmittance relative to polar angles in the liquid crystal display devices of Examples 1, 2, and 4.

FIG. 28 is a schematic cross-sectional view of a louver layer included in a liquid crystal display device of Example 4. FIG. 29 shows simulation results demonstrating a transmittance relative to polar angles in the liquid crystal display devices of Examples 1, 2, and 4. The liquid crystal display device of Example 4 corresponds to the liquid crystal display device of Modified Example 2 of Embodiment 3 including the louver layer 20L having the three-layer structure. A viewing angle of the liquid crystal display device of Example 4 in a narrow viewing angle mode was calculated by simulation. A function required for an onboard viewing angle control display is the function of hiding a monitor for a passenger's seat from a driver side. In view of this, in Example 4, as illustrated in FIG. 28, an onboard liquid crystal display device disposed in front of a driver's seat and a passenger's seat was investigated.

The size of the display panel 10 was 12.4 inches, the resolution was FHD, the width of the pixels 10P in the extension direction of the gate lines 10G (pixel pitch 10PI) was 48 µm, and the width of the pixels 10P in the extension direction of the source lines 10S was 144 µm.

As illustrated in FIG. 28, the louver layer 20L had a three-layer structure including the first light-shielding portions 20L1 (first light-shielding layer), the second light-shielding portions 20L2 (second light-shielding layer), and the third light-shielding portions 20L3 (third light-shielding layer). The first light-shielding portions 20L1, the second light-shielding portions 20L2, and the third light-shielding portions 20L3 had a slit width 20Lsw of 4.00 µm, a light-shielding width 20Lw of 4.00 µm, and a slit pitch 20Lp of 8.00 µm.

In a plan view, a gap (third gap B3) between a first light-shielding portion 20L1 and a second light-shielding portion 20L2 adjacent to the driver side (driver's seat side) of the first light-shielding portion 20L1 was 0.5 µm. In a plan view, a gap (fourth gap B4) between a third light-shielding portion 20L3 and a second light-shielding portion 20L2 adjacent to the driver side (driver's seat side) of the third light-shielding portion 20L3 was 2.25 µm.

The insulating layer 222 was an organic insulating film. The inter-slit distance 20Lsd between the first light-shielding portions 20L1 and the third light-shielding portions 20L3, that is, the thickness of the insulating layer 222 disposed between the first light-shielding portions 20L1 and the third light-shielding portions 20L3, was 1.25 µm. The inter-slit distance 20Lsd between the third light-shielding portions 20L3 and the second light-shielding portions 20L2, that is, the thickness of the insulating layer 222 disposed between the third light-shielding portions 20L3 and the second light-shielding portions 20L2, was 1.25 µm.

Simulation results show that the liquid crystal display device of Example 4 can also achieve a narrow viewing angle with a polar angle of 17° in a manner similar to Example 1 on the driver's seat side as illustrated in FIG. 28. On the passenger's seat side, a viewing angle of 90° was obtained.

In the case of Example 2, since a narrow viewing angle is to be obtained, transmitted light entering from the backlight 40 and passing to the viewing surface side decreases. Simulation results in FIG. 29 show that, supposing an omnidirectional luminance as a sum of luminances in all the azimuths in Example 1 is 100%, the omnidirectional luminance of Example 2 is 13%, which shows a significant decrease in luminance. In Examples 1 and 2, since a narrow viewing angle is to be obtained, luminance unevenness such as darkening at the left and right sides when seen from the screen center occurs. On the other hand, in Example 4, light distribution characteristics in which a narrow viewing angle is obtained only on the driver's seat side increased transmitted light on the passenger's seat side, and the omnidirectional luminance increased to 143% of that of Example 1.

Example 5

Figure 30:
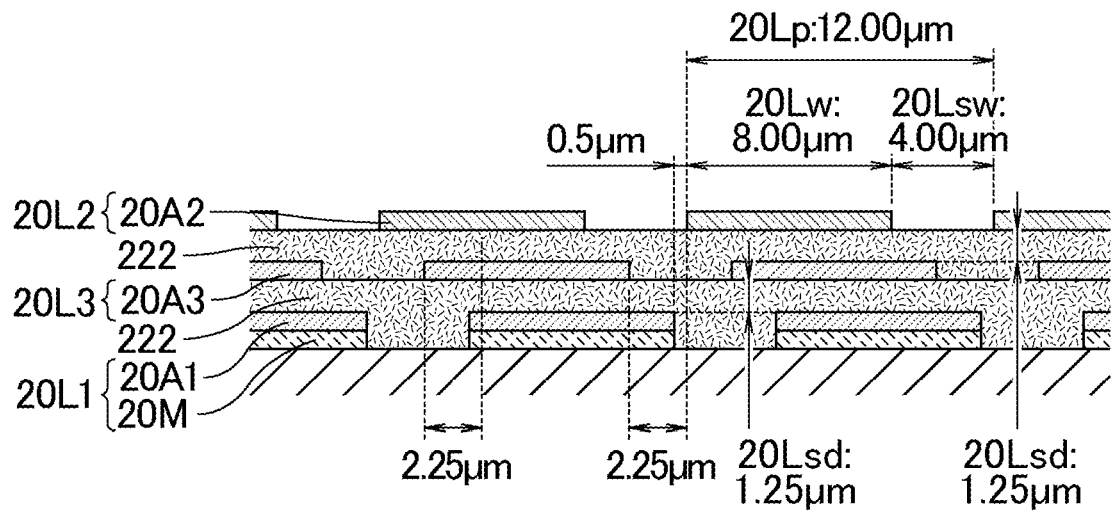
FIG. 30 is a schematic cross-sectional view of a louver layer included in a liquid crystal display device of Example 5.

FIG. 30 is a schematic cross-sectional view of a louver layer included in a liquid crystal display device of Example 5. The liquid crystal display device of Example 5 has substantially the same structure as that of Example 4 except that the louver layer 20L has the structure illustrated in FIG. 30. A viewing angle of the liquid crystal display device of Example 5 in a narrow viewing angle mode was calculated by simulation. A result of the simulation shows that a narrow viewing angle can be obtained in the privacy mode in a manner similar to Examples 1 to 4. In Examples 1 to 4, the slit width 20Lsw and the light-shielding width 20Lw were both 4.00 µm, but are not necessarily the same width, and as in the present example, the slit width 20Lsw and the light-shielding width 20Lw may be different from each other. With respect to the slit pitch 20Lp, all the light-shielding layers (the first light-shielding layer, the second light-shielding layer, and the third light-shielding layer) do not need to have the same pitch, and may have different pitches as necessary.

Example 6

Figure 31:
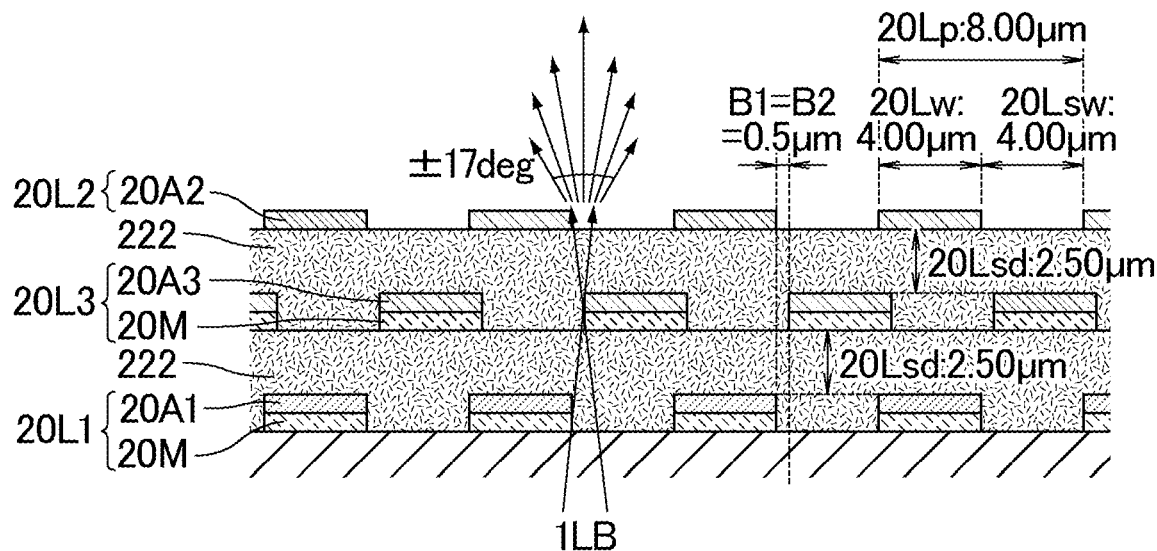
FIG. 31 is a schematic cross-sectional view of a louver layer included in a liquid crystal display device of Example 6.
Figure 32:
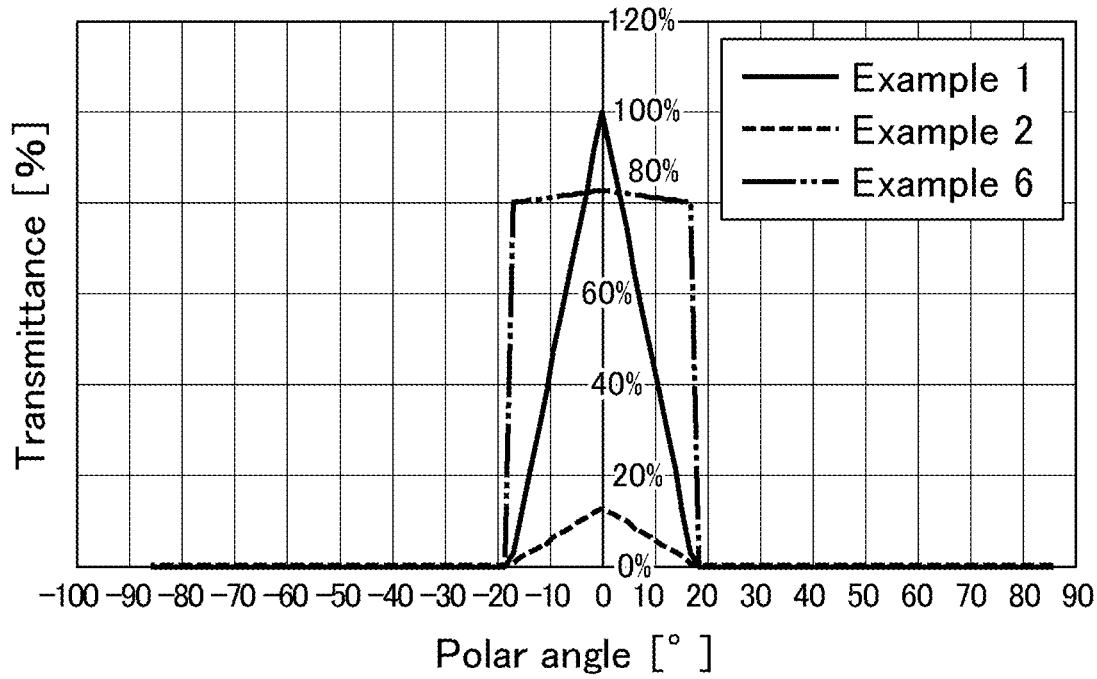
FIG. 32 shows simulation results demonstrating transmittance relative to polar angles in the liquid crystal display devices of Examples 1, 2, and 6.

FIG. 31 is a schematic cross-sectional view of a louver layer included in a liquid crystal display device of Example 6. FIG. 32 shows simulation results demonstrating a transmittance to a polar angle in the liquid crystal display devices of Examples 1, 2, and 6. The liquid crystal display device of Example 6 has substantially the same structure as that of Example 2 except that the louver layer 20L has the structure illustrated in FIG. 31. More specifically, the louver layer 20L of Example 6 has the same structure as that of the louver layer 20L of Example 2 except that each of the third light-shielding portions 20L3 includes the third light-absorbing layer 20A3, and the reflective surface 20M overlapping the third light-absorbing layer 20A3 and located at the surface on the backlight 40 side. A viewing angle of the liquid crystal display device of Example 6 in a narrow viewing angle mode was calculated by simulation.

As illustrated in FIG. 32, the omnidirectional luminance of Example 2 was 13% of that of Example 1, whereas the omnidirectional luminance of Example 6 was significantly increased and 164% of that of Example 1. This is supposed to be because of the following reasons. In Example 2, only each of the first light-shielding portions 20L1 includes the reflective surface 20M at the surface on the backlight 40 side, and light incident on the liquid crystal panel 20 at a high polar angle is absorbed in the third light-absorbing layer 20A3 of the third light-shielding portions 20L3. On the other hand, in Example 6, in addition to the first light-shielding portions 20L1, each of the third light-shielding portions 20L3 includes the reflective surface 20M at the surface on the backlight 40 side, and thus, light incident on the liquid crystal panel 20 at a high polar angle is reflected on the reflective surface 20M and light can be recycled. Accordingly, the omnidirectional luminance is enhanced, and the effect of enhancing luminance is obtained. In the example, light recycle efficiency was 80%.

Example 7

Figure 33:
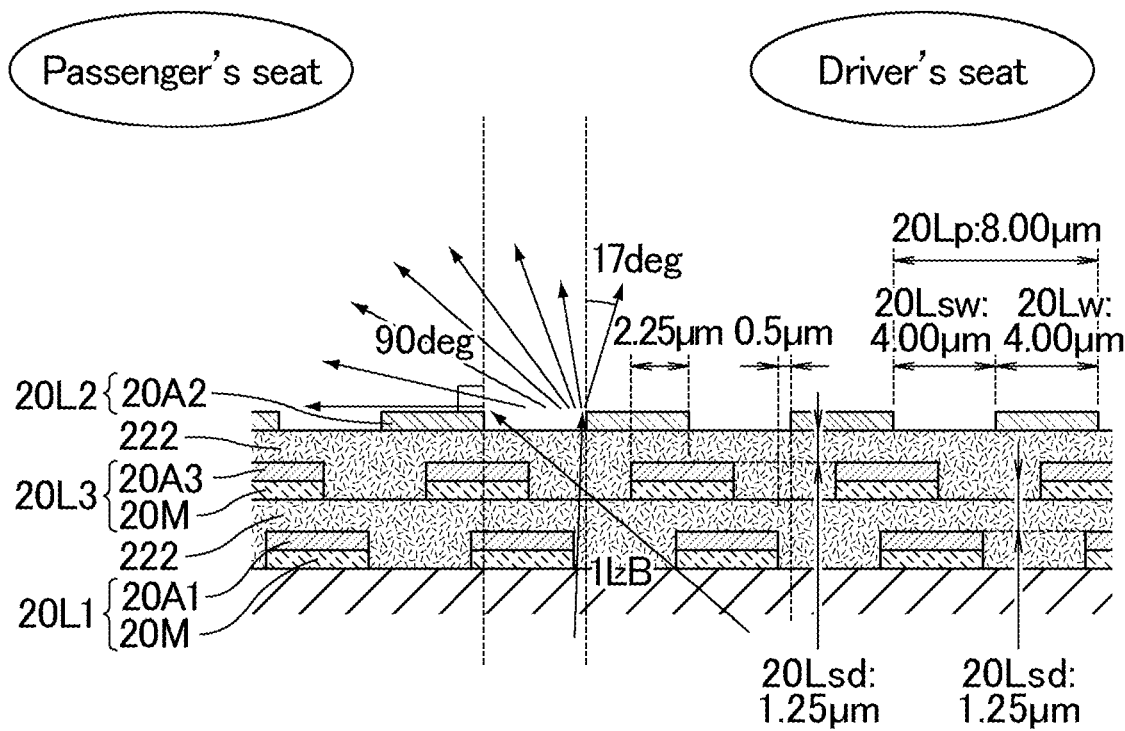
FIG. 33 is a schematic cross-sectional view of a louver layer included in a liquid crystal display device of Example 7.
Figure 34:
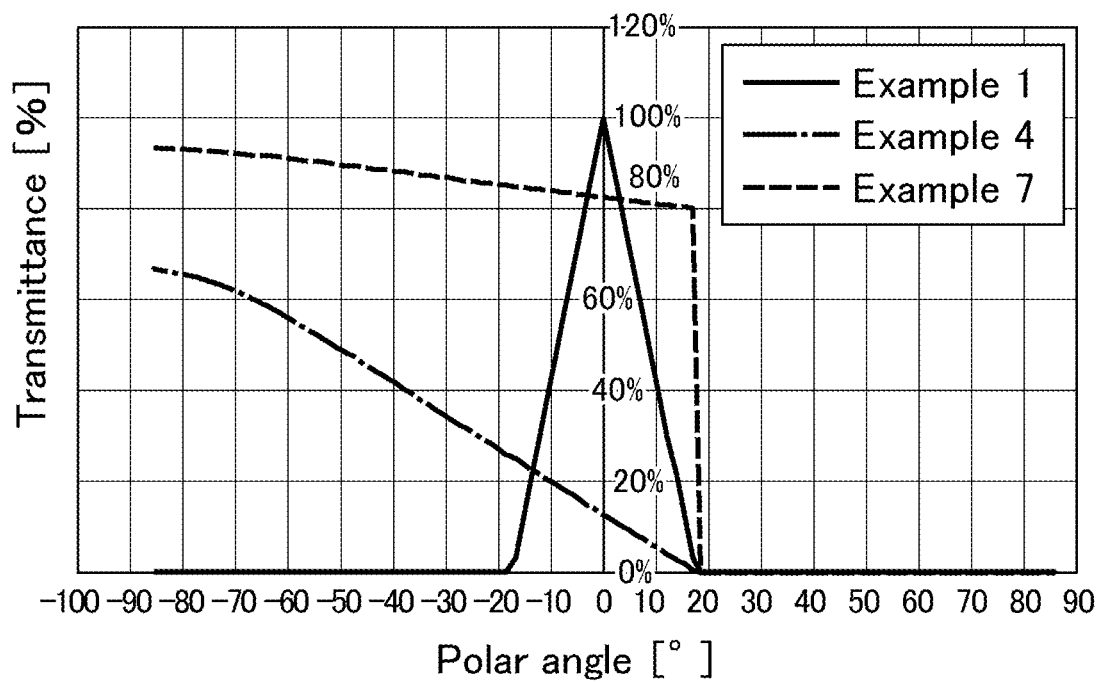
FIG. 34 shows simulation results demonstrating transmittance relative to polar angles in the liquid crystal display devices of Examples 1, 4, and 7.
Figure 35:
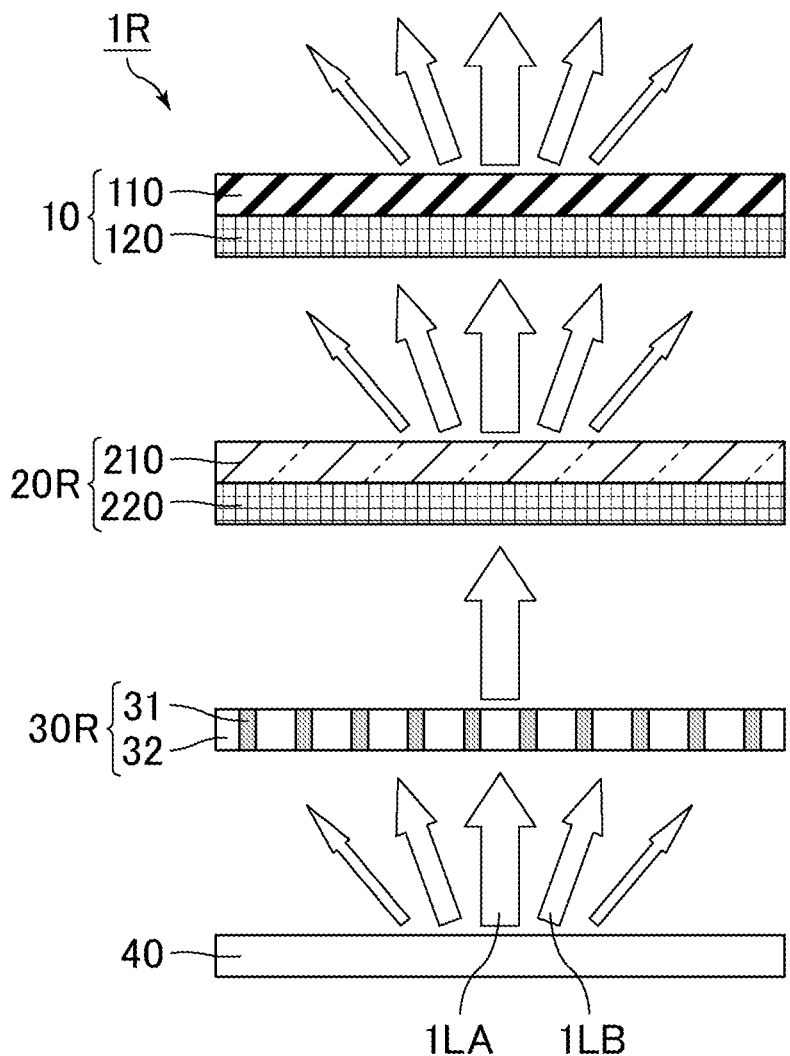
FIG. 35 is a schematic cross-sectional view illustrating a wide viewing angle mode of a liquid crystal display device of the comparative example.
Figure 36:
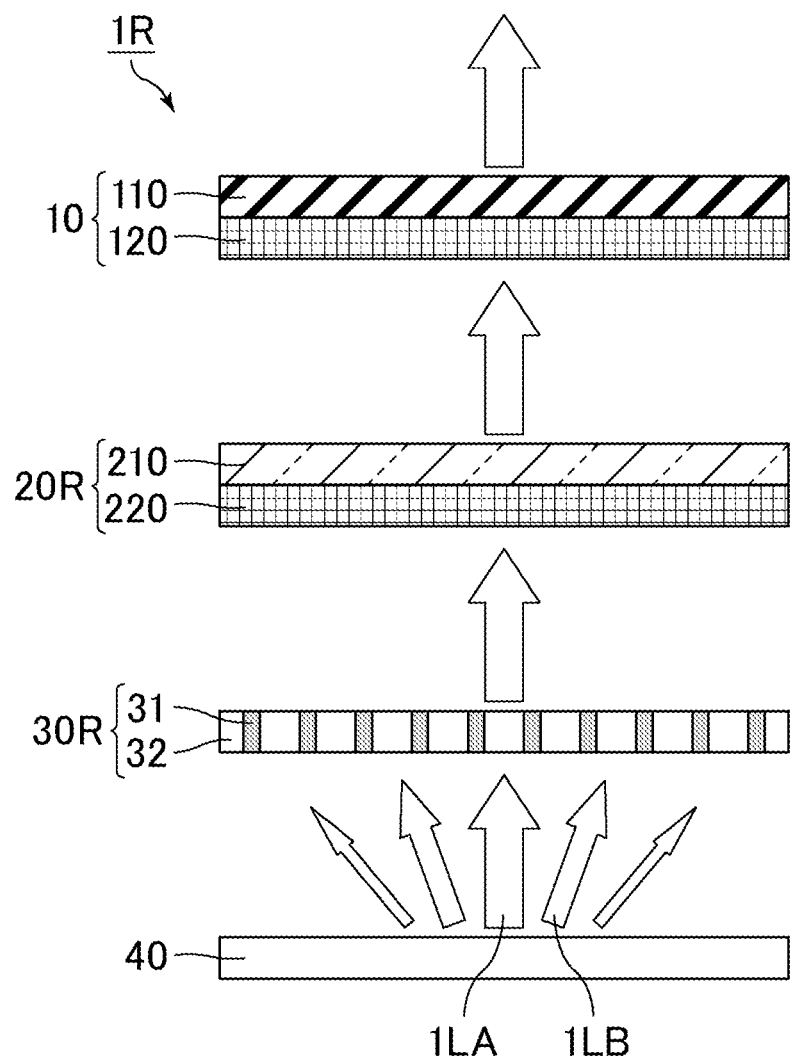
FIG. 36 is a schematic cross-sectional view showing a narrow viewing angle mode of the liquid crystal display device of the comparative example.

FIG. 33 is a schematic cross-sectional view of a louver layer included in a liquid crystal display device of Example 7. FIG. 34 shows simulation results demonstrating a transmittance relative to polar angles in the liquid crystal display devices of Examples 1, 4, and 7. The liquid crystal display device of Example 7 has substantially the same structure as that of Example 4 except that the louver layer 20L has the structure illustrated in FIG. 33. More specifically, the louver layer 20L of Example 7 has the same structure as that of the louver layer 20L of Example 4 except that each of the third light-shielding portions 20L3 includes the third light-absorbing layer 20A3, and the reflective surface 20M overlapping the third light-absorbing layer 20A3 and located at the surface on the backlight 40 side. A viewing angle of the liquid crystal display device of Example 7 in a narrow viewing angle mode was calculated by simulation.

As illustrated in FIG. 34, the omnidirectional luminance of Example 4 was 143% of that of Example 1, whereas the omnidirectional luminance of Example 7 was significantly increased and 400% of that of Example 1. This is supposed to be because of the following reasons. In Example 4, only each of the first light-shielding portions 20L1 includes the reflective surface 20M at the surface on the backlight 40 side. On the other hand, in Example 7, in addition to the first light-shielding portions 20L1, each of the third light-shielding portions 20L3 also includes the reflective surface 20M at the surface on the backlight 40 side. Thus, light can be recycled, and the omnidirectional luminance is enhanced so that the effect of enhancing luminance can be thereby obtained.

REFERENCE SIGNS LIST

1, 1R: liquid crystal display device
1LA: front light
1LB: oblique light
10: display panel
10A1: display region
10A2: non-display region
10B: black matrix (BM) layer
10EL: organic electroluminescence display panel
10G: gate line
10LC: liquid crystal display panel
10P: pixel
10PI: pixel pitch
10S: source line
20, 20R: liquid crystal panel
20L, 30R: louver layer
20A1: first light-absorbing layer
20A2: second light-absorbing layer
20A3: third light-absorbing layer
20A4: fourth light-absorbing layer
20L1: first light-shielding portion
20L2: second light-shielding portion
20L3: third light-shielding portion
20L4: fourth light-shielding portion
20Lp: slit pitch
20Lsd, Lsd: inter-slit distance
20Lsw, Lsw: slit width
20Lw: light-shielding width
20M: reflective surface
31: light-shielding layer
32: transparent layer
40: backlight
41: light source
42: reflective sheet
43: light guide plate
110: color filter (CF) substrate
120: thin-film transistor (TFT) substrate
130: liquid crystal layer
210: first substrate
211: first support substrate
212: first electrode
220: second substrate
221: second support substrate
222: insulating layer
222A: hole
223: second electrode
230: polymer dispersed liquid crystal
231: polymer network
232: liquid crystal component
B1, B2, B3, B4: gap
Lsw0: width

What is claimed is:

1. A liquid crystal display device comprising:
    a liquid crystal panel; and
    a display panel that displays an image,
    the liquid crystal panel including:
        a first support substrate,
        a second support substrate facing the first support substrate,
        a polymer dispersed liquid crystal layer sealed between the first support substrate and the second support substrate,
        first light-shielding portions extending parallel to one another,
        second light-shielding portions extending parallel to one another in the same direction as the first light-shielding portions, and
        an insulating layer located between the first light-shielding portions and the second light-shielding portions,
    the second support substrate, the first light-shielding portions, the insulating layer, the second light-shielding portions, the polymer dispersed liquid crystal layer, and the first support substrate being located in the stated order from a back surface side toward a viewing surface side,
    wherein in a plan view:
        the first light-shielding portions are located at the same positions as the second light-shielding portions in a panel center,
        the first light-shielding portions are shifted from the second light-shielding portions in a panel end, and
        a width of each of the first light-shielding portions is equal to a width of each of the second light-shielding portions.

2. The liquid crystal display device according to claim 1, wherein each of the first light-shielding portions includes a reflective surface at a surface on the back surface side.

3. The liquid crystal display device according to claim 1, wherein the display panel includes pixels arranged in a matrix pattern, and
    with a distance between adjacent first light-shielding portions being defined as a slit width of the first light-shielding portions, a width of each of the first light-shielding portions in a lateral direction being defined as a light-shielding width of the first light-shielding portions, and a sum of the slit width of the first light-shielding portions and the light-shielding width of the first light-shielding portions being defined as a slit pitch of the first light-shielding portions,
    a pixel pitch of the pixels is an integral multiple of the slit pitch of the first light-shielding portions.

4. The liquid crystal display device according to claim 1, further comprising a backlight,
    wherein the display panel is a liquid crystal display panel.

5. The liquid crystal display device according to claim 4, wherein the liquid crystal display device includes, sequentially from the viewing surface side toward the back surface side, the liquid crystal display panel, the liquid crystal panel, and the backlight.

6. The liquid crystal display device according to claim 4, wherein the liquid crystal display device includes, sequentially from the viewing surface side toward the back surface side, the liquid crystal panel, the liquid crystal display panel, and the backlight.

7. The liquid crystal display device according to claim 1, wherein the display panel is an organic electroluminescence display panel, and
the liquid crystal display device includes, sequentially from the viewing surface side toward the back surface side, the liquid crystal panel and the organic electroluminescence display panel.

8. The liquid crystal display device according to claim 1, wherein, in the plan view, at least a part of each of the first light-shielding portions does not overlap a corresponding second light-shielding portion in the panel end.

9. A liquid crystal display device comprising:
a liquid crystal panel; and
a display panel that displays an image,
the liquid crystal panel including:
  a polymer dispersed liquid crystal layer,
  first light-shielding portions extending parallel to one another,
  second light-shielding portions extending parallel to one another in the same direction as the first light-shielding portions and located closer to a viewing surface side than the first light-shielding portions are, and
  an insulating layer located between the first light-shielding portions and the second light-shielding portions,
the insulating layer being provided with holes in a surface on the viewing surface side,
each of the second light-shielding portions covering a corresponding hole, and
the holes each having a depth greater than a thickness of a corresponding second light-shielding portion,
wherein in a plan view, the first light-shielding portions are located at the same positions as the second light-shielding portions in a panel center, and the first light-shielding portions are shifted from the second light-shielding portions in a panel end; and
wherein the liquid crystal panel includes a first support substrate and a second support substrate facing the first support substrate, and the second support substrate, the first light-shielding portions, the insulating layer, the second light-shielding portions, the polymer dispersed liquid crystal layer, and the first support substrate are located in the stated order from a back surface side toward the viewing surface side.

10. The liquid crystal display device according to claim 9, wherein each of the first light-shielding portions includes a reflective surface at a surface on a back surface side.

11. The liquid crystal display device according to claim 9, wherein the display panel includes pixels arranged in a matrix pattern, and
with a distance between adjacent first light-shielding portions being defined as a slit width of the first light-shielding portions, a width of each of the first light-shielding portions in a lateral direction being defined as a light-shielding width of the first light-shielding portions, and a sum of the slit width of the first light-shielding portions and the light-shielding width of the first light-shielding portions being defined as a slit pitch of the first light-shielding portions,
a pixel pitch of the pixels is an integral multiple of the slit pitch of the first light-shielding portions.

12. The liquid crystal display device according to claim 9, further comprising a backlight,
wherein the display panel is a liquid crystal display panel.

13. The liquid crystal display device according to claim 12, wherein the liquid crystal display device includes, sequentially from the viewing surface side toward a back surface side, the liquid crystal display panel, the liquid crystal panel, and the backlight.

14. The liquid crystal display device according to claim 12, wherein the liquid crystal display device includes, sequentially from the viewing surface side toward a back surface side, the liquid crystal panel, the liquid crystal display panel, and the backlight.

15. The liquid crystal display device according to claim 9, wherein the display panel is an organic electroluminescence display panel, and
the liquid crystal display device includes, sequentially from the viewing surface side toward a back surface side, the liquid crystal panel and the organic electroluminescence display panel.

* * * * *